United States Patent [19]

Moskovich

[11] Patent Number: 4,685,774
[45] Date of Patent: Aug. 11, 1987

[54] PROJECTION LENS

[75] Inventor: Jacob Moskovich, Cincinnati, Ohio

[73] Assignee: U.S. Precision Lens, Incorporated, Cincinnati, Ohio

[21] Appl. No.: 820,553

[22] Filed: Jan. 17, 1986

[51] Int. Cl.$^4$ .............. G02B 13/18; G02B 1/06; G02B 9/12; G02B 9/34

[52] U.S. Cl. ................ 350/432; 350/412; 350/418; 350/469; 350/477

[58] Field of Search ........... 350/412, 418, 419, 432, 350/477, 469, 481

[56] References Cited

U.S. PATENT DOCUMENTS

| 2,417,330 | 3/1947 | Strang | 350/481 |
|---|---|---|---|
| 2,440,088 | 4/1948 | Grey | 350/453 |
| 2,468,564 | 4/1949 | Luneburg | 350/432 |
| 2,479,907 | 8/1949 | Cox | 350/432 |
| 2,502,543 | 4/1950 | Warmisham | 350/432 |
| 2,552,672 | 5/1951 | Grey | 350/432 |
| 2,638,034 | 5/1953 | Wreathall | 350/432 |
| 2,660,094 | 11/1953 | Wreathall | 350/432 |
| 2,737,849 | 3/1956 | Tiller | 350/469 |
| 2,865,253 | 12/1958 | Thielens | 350/481 |
| 3,429,997 | 2/1969 | Rosner et al. | 350/438 |
| 3,567,304 | 3/1971 | Kruger | 350/481 |
| 3,778,133 | 12/1973 | Tatian | 350/432 |
| 3,800,085 | 3/1974 | Ambats et al. | 350/420 |
| 3,817,604 | 6/1974 | Watt | 350/481 X |
| 3,868,173 | 2/1975 | Miles et al. | 350/432 X |
| 3,951,523 | 4/1976 | Nishimoto | 350/432 |
| 3,980,399 | 9/1976 | Howden | 350/432 |
| 3,998,527 | 12/1976 | Ikeda et al. | 350/432 |
| 4,099,848 | 7/1978 | Osakabe | 350/432 |
| 4,181,409 | 1/1980 | Whitney et al. | 350/432 |
| 4,240,701 | 12/1980 | Lytle | 350/432 |
| 4,300,817 | 11/1981 | Betensky | 350/412 |
| 4,348,081 | 9/1982 | Betensky | 350/412 |
| 4,397,520 | 8/1983 | Neil | 350/481 X |
| 4,474,437 | 10/1984 | Gorenstein | 350/432 |
| 4,479,695 | 10/1984 | Neil | 350/432 X |
| 4,526,442 | 7/1985 | Betensky | 350/412 |
| 4,561,736 | 12/1985 | Furter et al. | 350/432 X |
| 4,564,269 | 1/1986 | Uehara | 350/412 X |
| 4,577,935 | 3/1986 | Yamakawa et al. | 350/412 X |
| 4,603,950 | 8/1986 | Uehara et al. | 350/412 X |

FOREIGN PATENT DOCUMENTS

| 57-101812 | 6/1982 | Japan . |
|---|---|---|
| 57-108815 | 7/1982 | Japan . |
| 57-108818 | 7/1982 | Japan . |
| 57-177115 | 10/1982 | Japan . |
| 58-125007 | 7/1983 | Japan . |
| 58-118616 | 7/1983 | Japan . |
| 58-140708 | 8/1983 | Japan . |
| 58-139110 | 8/1983 | Japan . |
| 58-139111 | 8/1983 | Japan . |
| 59-133518 | 7/1984 | Japan . |
| 59-133517 | 7/1984 | Japan . |
| 59-121016 | 7/1984 | Japan . |
| 59-170812 | 9/1984 | Japan . |
| 59-219709 | 12/1984 | Japan . |
| 593514 | 10/1947 | United Kingdom . |
| 1269133 | 4/1972 | United Kingdom . |

OTHER PUBLICATIONS

Cox; *A System of Optical Design*, Focal Press (1965); pp. 470–482.

"Minimax Approximation by a Semi-Circle" by Charles B. Dunham and Charles R. Crawford, published in the Society for Industrial and Applied Mathematics Journal, vol. 17, No. 1, Feb. 1980.

*Primary Examiner*—John K. Corbin
*Assistant Examiner*—Scott J. Sugarman
*Attorney, Agent, or Firm*—Costas, Montgomery & Dorman

[57] ABSTRACT

A compact projection lens for a cathode ray tube having a field angle as great as 73° which may utilize only three lens elements where the first lens element from the image side has two aspheric surfaces in the shape of an overall meniscus which goes from positive optical power at the optical axis to relatively strong negative optical power at the limit of the clear aperture of the lens. The spacing between the first and second lens elements is chosen to aid in contributing to correction of field curvature.

60 Claims, 4 Drawing Figures

PROJECTION LENS

FIELD OF THE INVENTION

This invention relates to projection lenses, and more particularly, relates to projection lenses for cathode ray tubes (CRT) and wide screen television.

BACKGROUND OF THE INVENTION

A preferred form of projection lenses for wide screen television is disclosed in U.S. Pat. Nos. 4,348,081, 4,300,817, and 4,526,442, all assigned to the assignee of the present application.

In these previous patents, the lens units have been referred to as groups which perform specified or distinct optical functions. However, in accordance with present United States Patent and Trademark Office requirements, the overall lens will be defined in terms of optical "units". It will be understood that the term "units" refers to one or more optical elements or components air spaced from another optical unit.

It is well known that a specified optical function(s) of a lens unit or group in an overall lens may be accomplished by using one element or component or more than one element or component dependent upon the correction or function desired. A decision as to whether one or more elements is used as a lens unit in an overall lens design may be based on various considerations, including but not limited to, ultimate performance of the overall lens, ultimate costs of the lens, acceptable size of the lens, etc. Accordingly, in the following specification and appended claims, the term "lens unit" refers to one or more lens elements or lens components which provide a defined optical function or functions in the design of the overall lens.

The lenses disclosed in the aforementioned patents generally comprise three lens units: from the image end a first lens unit, haing at least one aspheric surface, which serves as an aberration corrector; a second lens unit including a biconvex element which supplies all or substantially all of the positive power of the lens; and a third lens unit having a concave surface towards the image end of the lens, serving as a field flattener, and essentially correcting the Petzval curvature of the first and second groups.

The lenses, as disclosed, are designed for use with a surface of a cathode ray tube (CRT). The lenses of U.S. Pat. No. 4,300,817, utilizing a single biconvex element in the second lens unit, all have an equivalent focal length (EFL) of one hundred twenty-seven millimeters or greater, while the lenses of U.S. Pat. No. 4,348,081, which utilize a two-element second lens unit, including the biconvex element, may have an EFL reduced to eighty-five millimeters as designed for direct projection for a five inch diagonal CRT. The lenses described in U.S. Pat. No. 4,526,442 are designed to have a fold in the optical axis between the first and second lens units and have been designed so that the EFL is as low as one hundred twenty-six millimeters. These EFL's are also for CRT screens having a viewing surface with an approximate five inch diagonal.

Projection TV sets are rather bulky and have required high volume cabinets. One manner of reducing the cabinet size is to decrease the EFL of the projection lenses. This, of course, increases the field angle of the lens.

A further consideration is introduced wherein a spacing is provided between the phosphor screen of the CRT and the third lens unit of the projection lens. This spacing may be required for the inclusion of a liquid cooling material and a housing necessary to enclose the coolant against the face of the CRT. This additional spacing between the face of the CRT causes the third negative lens unit to contribute more negative power, which must be compensated by increased power in the positive second lens unit.

An effect of increasing the angular coverage of the lens as a result of decreasing the EFL, is that the aberrations become more difficult to correct. A single biconvex element second lens unit, as shown in the aforementioned patents, does not provide the lens designer adequate degrees of freedom to correct for the resulting astigmatism and distortion. By dividing the optical power of the second lens unit, as disclosed in U.S. Pat. No. 4,348,081, the EFL may be shortened. However, merely splitting the optical power of the second lens unit into two elements to obtain additional degrees of optical design freedom, does not provide acceptable contrast and resolution where the angular coverage of the projection lenses is required to be in excess of twenty-seven degrees, semi-field.

The EFL of the lens is a function of the total conjugate distance between the CRT and the display screen. This is shown by the relationship $$OL = EFL(1+1/M) + EFL(1+M)$$

where OL is the overall conjugate distance of the system from object to image
 EFL $(1+M)$ is the distance from the image to the first principal point of the lens
 EFL $(1+1/M)$ is the distance from the object to the second principal point of the lens and
 M is the magnification of the system expressed as the ratio of object height to image height.

Therefore, in order to decrease the total distance between the CRT and the screen, it is necessary to reduce the EFL.

Projection lens of the overall type described have been designed with decreased EFL's by designing a more complex second lens unit split into more than one lens element as exemplified in the lenses disclosed in co-pending application Ser. Nos. 642,825 and 652,062, filed Aug. 21, 1984 and Sept. 19, 1984, respectively.

These designs are currently used on many wide screen projection television sets and may have an equivalent focal length as low as eighty millimeters. It will be understood that the EFL will be greater if there is a fold in the optical axis between the first and second lens units.

Co-pending application Ser. No. 776,140, filed Sept. 13, 1985, discloses a projection lens in which the EFL is reduced to less than sixty millimeters.

In lenses of the type disclosed in the previously mentioned patents, the conventional way to accomplish this is to use a retrofocus or inverted telephoto type of design. Generally stated, a retrofocus lens is one in which the back focal length (BFL) is greater than the equivalent focal length. Lenses of this type have a negative group on the object end followed by a positive group. In this construction a very wide angle of the object can be covered, but the second lens unit requires two elements.

To achieve the objects of this invention, the aspheric surfaces of the lens units and the field flattener lens unit must be configured to achieve the desired aberration correction. It is difficult to describe aspheric surfaces in paraxial powers, since the optical power of the lens elements will vary with height from the optical axis. Therefore, the term of "aspheric optical power" will be used to describe the variation of the power of the lens element as a function of the height from the optical axis at which this optical power is computed. We will define the "AOP" in the following way:

$$K_y = (n-1)(C_{1y} - C_{2y})$$

where $K_y$ is the "aspheric optical power" or "AOP" at height y;

$C_{1y}$ and $C_{2y}$ are the local curvatures of the first and the second surfaces of the element, respectively, at height y;

n is the index of refraction of the material from which the lens element is made.

As can be seen, this formula is essentially a thin-lens formula for the optical power of the single lens element, except now it must be calculated not just on optical axis of the element, but at various heights from that axis. In addition to that, the surfaces and powers of the lens units having aspheric surfaces will be at least partially described in terms of "approximating or best fitting spheres" or in terms of optical power based on lens elements having "approximating or best fitting spherical surfaces".

Approximating or best fitting spherical surfaces with respect to aspheric surfaces are discussed in a paper entitled, "Minimax Approximation By A Semi-Circle", by Charles B. Dunham and Charles R. Crawford, published in the Society For Industrial And Applied Mathematics Journal, Vol. 17, No. 1, February, 1980, the disclosure of which is incorporated herein by reference.

An algorithm prepared by one of the authors of the above referenced paper for defining the approximation of best fit of spherical surfaces with respect to aspherical surfaces is hereinafter set forth.

SUMMARY OF THE INVENTION

Briefly stated, the invention in one form thereof comprises a lens of the type described, which consists of a first lens unit which comprises a single element with two aspheric surfaces, and an overall positive meniscus shape preferably convex to the image end, a second positive element, and a third lens unit having a strongly negative surface concave to the image end. The first lens element is of positive optical power at the optical axis of the lens, but due to the aspheric power of the surfaces, the positive optical power decreases with distance from the optical axis until it becomes strongly negative at or closely adjacent the clear aperture of the first lens element, as hereinafter explained.

The strong negative power of the third lens unit contributes to correction of the Petzval sum of the other lens elements. The strongly concave aspheric surface also corrects for distortion and residual astigmatism which is not corrected by the second positive lens element. The second lens element provides the majority of the positive power of the lens and some correction for astigmatism. The first lens element must then correct the aperture dependent aberrations and particularly, spherical and coma. A lens embodying the invention is very compact having the first and second lens unit spaced more closely than heretofore. A lens embodying the invention may have a field angle as great as 73° while comprising only three elements.

An object of this invention is to provide a new and improved projection lens of the type described, having a wider field angle and consisting of as little as three lens elements.

Another object of this invention is to provide a more compact lens of the type described.

The features of the invention which are believed to be novel are particularly pointed out and distinctly claimed in the concluding portion of the specification. The invention, however, together with further objects and advantages thereof, may best be appreciated by reference to the following detailed description taken in conjunctio with the drawings.

DETAILED DESCRIPTION OF PREFERRED EMBODIMENTS OF THE INVENTION

Figure 1:
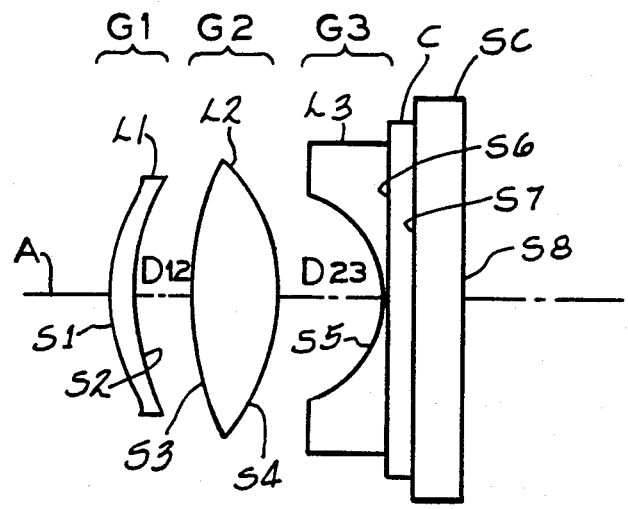
FIGS. 1-3 are diagrammatic side elevations of lenses embodying the invention.

Nine different projection lenses embodying the invention are set forth in Tables I-IX and exemplified in the drawings.

Figure 2:
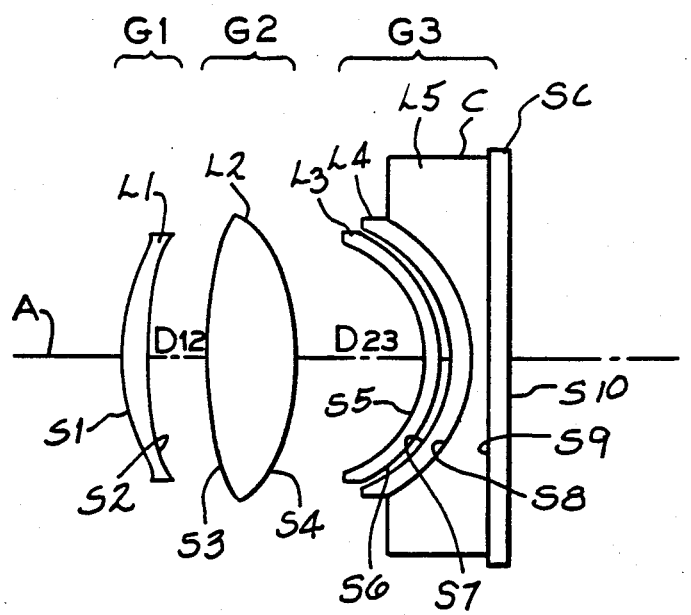
Figure 3:
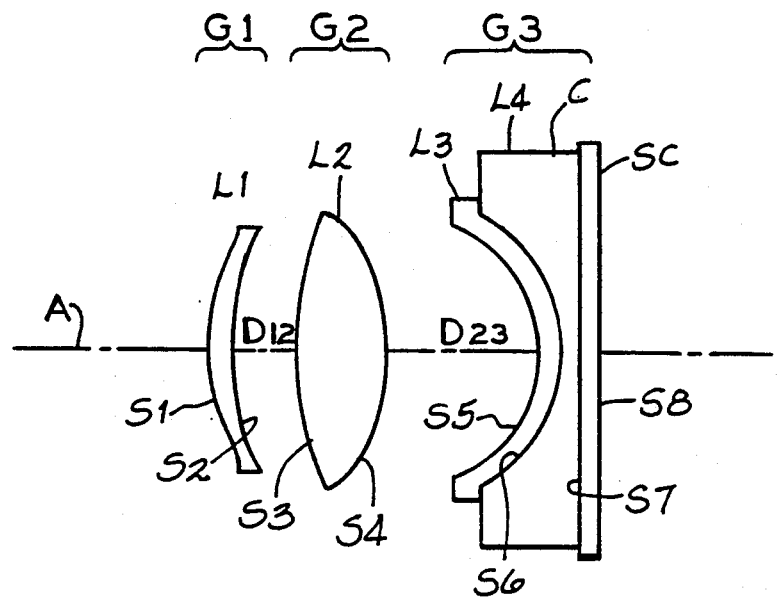

In the drawings, the lens units are identified by the reference G followed by successive arabic numerals; lens elements are identified by the reference L followed by successive arabic numerals from the image to the object end. Surfaces of the lens elements are identified by the reference S followed by successive arabic numerals form the image to the object end. The reference SC denotes the screen of a cathode ray tube while the reference C denotes a liquid optical coupler between the screen SC and the overall lens. In the embodiments of FIGS. 2 and 3, the coupler C contributes optical power as hereinafter explained.

In all disclosed embodiments of the invention, the first lens unit G1 consists of an overall positive shaped meniscus and both surfaces are aspheric.

The second lens unit G2 consists of a single biconvex element. The second lens unit G2 has one or more aspheric surfaces.

The third lens unit G3 in all embodiments acts as a field flattener, that is, it corrects the Petzval curvature of the first and second lens units. Surface S5 is made aspheric to correct for distortion. The spacing of L1 and L2 is important in aiding in the correction of field curvature. The spacing $D_{12}$ between the first and second lens units should be $$0.16 < |D_{12}/F_3| < 0.47$$

where $F_3$ is the equivalent focal length of the third lens unit.

If $|D_{12}/F_3|$ goes below 0.16, the field curvatuve becomes overcorrected and the image quality becomes unacceptable. If $|D_{12}/F_3|$ exceeds 0.47, the field curvature is undercorrected and the image quality is again not acceptable.

As one attempts to increase the field angle of the lens, more astigmatism is introduced. This may be corrected at the expense of correction of spherical aberration in the second lens unit G2.

The lens unit G1 then must correct for the spherical aberration introduced by lens unit G2 as well as coma and some other off-axis aberrations.

This is achieved by providing element L1 with two aspheric surfaces S1 and S2, which define element L1 as having positive optical power at the optical axis which decreases with distance from the optical axis and changes to negative optical power, which becomes very strong at the limit of the clear aperture. In fact, the negative optical power at the clear aperture is at least two and one-half times (absolute) the positive optical power at the optical axis. Otherwise stated, $$|K y_{CA}/K y_A| > 2.5$$

where $Ky_{CA}$ is the optical power of lens L1 at the limit of the clear aperture and $Ky_A$ is the optical power of Lens L1 at the optical axis thereof.

In the Tables I–IX, which are referred to as the primary prescriptions, each of the lenses is defined with respect to its actual prescription. Tables Ia–IXa, which may be referred to as secondary prescriptions, respectively, define the lenses with respect to the best approximating or best fitting spheres for each aspheric surface of Tables I–IX, respectively.

Table X sets forth the optical power of each lens unit $K_1$, $K_2$, $K_3$, of each lens to the overall power of the lens $K_0$, as the optical powers of the lens units are calculated from the radii of the elements of each lens unit at the optical axis as set forth in the primary prescriptions of Tables I–IX. However, such powers may not in all cases be completely descriptive of the powers of the lens units since the aspheric surfaces are defined by the equation $$x = \frac{C_i^2}{1 + \sqrt{1 - (1 + K)C^2 y^2}} + Dy^4 + Ey^6 + Fy^8 + Gy^{10} + Hy^{12} + Iy^{14}$$

where x is the surface sag at a semi-aperture distance y from the axis A of the lens, C is the curvature of a lens surface at the optical axis A equal to the reciprocal of the radius of the optical axis, K is a conic constant.

Accordingly, in Tables Ia–IXa, the prescriptions of the lens are recast with the aspheric surfaces defined in terms of the best fitting spherical surface, as hereinafter explained.

Figure 4:
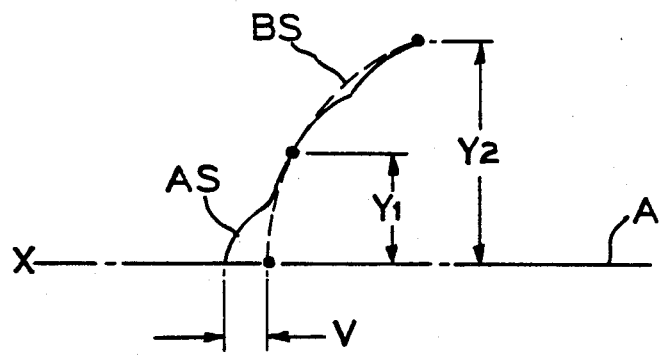
FIG. 4 is a diagrammatic view of an aspheric lens surface and also exemplifying the best fitting sphere therefor.

The best fitting or approximating sphere for an aspheric surface may be defined by the sag x of the spherical surface with respect to the height y from the optical axis where the sphere passes through the end of the clear aperture of the lens surface and another point vertically spaced from the optical axis. This approximation will probably result in the vertex of the approximating sphere on the optical axis A being displaced from the vertex of the aspheric surface on the optical axis A by a distance V, as shown in FIG. 4.

The term best fitting spherical surface is defined by a point at the extreme of the clear aperture of an aspheric lens surface and a point on the aspheric surface intermediate the extreme point of the clear aperture and the optical axis, where the vertex of a spherical curve through these two points is on the optical axis of both the aspheric surface and the best fitting spherical surface.

The aspheric equation has previously been set forth. Let the foregoing aspheric equation be defined by f and let CA/2 be the clear radius of a lens surface (one half the clear aperture of the surface).

Then $$x = f(y) \text{ for } 0 < y \leq CA/2$$

is the sag equation and y can be no greater than CA/2, and $$x = s(y) = V + \frac{cv^2}{1 + \sqrt{1 - c^2 v^2}}$$

where s(y) is the sag equation for the circle and c is the curvatuve of the best fitting spherical surface,. Choose initial values of c and V, where V is the axial departure of the vertex of the best fitting spherical surface from the vertex of the aspheric surface.

The spherical curvatuve c of the best fitting spherical surface is calculated in the following steps.

1. Initial values for c and V are:

$$c = 8N_1/N_3$$

$$V = (3y_2 + 4N_2/N_3 - 1)/c$$

where $$N_1 = f(y_2) - f(y_1)$$

$$N_2 = f(y_2)^2 - f(y_1)^2$$

$$N_3 = \sqrt{(9y_2^2 + 4N_1^2)(y_2^2 + 4N_1^2)}$$

$$y_1 = CA/4$$

$$y_2 = CA/2$$

2. Calculate new values for $0 < y_1 < y_2 \leq CA/2$ as to the two non-zero slutions of the equation $$f'(y) = \sqrt{1 - c^2 y^2} = c^2 y$$

where f'(y) is the derivative of f(y) with respect to y, or $$f' = df(y)/dy.$$

3. Calculate new values for c and V as $$c = \frac{2f(y_2)}{y_2^2 + f(y_2)^2}$$

$$V = \frac{f(y_1)}{2} - \frac{cy_1^2}{2(1 + \sqrt{1 - c^2 y_1^2})}$$

4. Repeat steps (2) and (3) until there is no essential change in c to the fourth or fifth most significant digit.

The final value of the curvature is that of a circle with its center on the optical axis A which is closest to the sag curve as described in the above identified publication. The sag equation for the circle can be written as $$x = s(y) = V + \frac{cy^2}{1 + \sqrt{1 - c^2 y^2}}$$

This sag equation describes a rotationally symmetric surface with a vertex at the optical axis A.

FIG. 4 exemplifies one-half of an aspheric surface AS and its best fitting spherical surface BS as determined by the foregoing equations. FIG. 4 is exaggerated for clarity of illustration.

In this manner the best fitting spherical surface for an aspheric surface may be determined. The distances V for the two surfaces of a lens element may then be determined and the thickness of the lens as well as the best fitting spheres of the surfaces may be utilized to determine the optical power of the lens element. The optical powers of the lens units of each disclosed lens as calculated on the basis of best fitting spherical surfaces is hereinafter set forth in Table XI.

In the primary prescriptions of Tables I-IX, there is set forth the aspheric optical power $K_y$ of the first lens element L1 of each prescription as a function of the height y from the optical axis to the limit of the clear aperture. It will be noted that in each case the power at the optical axis is positive and decreases with height y until it becomes negative and increases in negative power to an absolute value at least two and one-half times the optical power at the axis. These relationships are based on thin lens equations and do not take into account the thickness of the lens at the heights y. These relationships exemplify the change in optical power of the lens element L1 from the optical axis to the limit of the clear aperture of the lens.

The aspheric optical power $K_y$ is calculated from the equation $$K_y = (n-1)(C_{1y} - C_{2y})$$

where n is the index of refraction of lens element L1, $C_{1y}$ is the local curvature of the first lens surface at a height y from the optical axis A, and $C_{2y}$ is the local curvature of the second lens surface at the height y from the optical axis.

Tables I-IV and IX set forth the prescriptions of lenses as shown in FIG. 1.

Table V sets forth the prescription of a lens as generally set forth in FIG. 1, but with the rear surface of the CRT screen SC being convex and thus contributing optical power to the lens system.

Tables VI and VII set forth a prescription for the lens of FIG. 2 where the optical coupler C provides optical power and is closed by a glass element L4, and another meniscus element L3 has an aspheric surface S5 to provide correction for distortion.

Table VIII sets forth a prescription for the lens of FIG. 3 where the element L3 closing the optical coupler C has an aspheric image side surface, and the CRT screen SC has a convex rear surface S8 which contributes optical power to the system. In this embodiment, the element L3 is a polycarbonate which has a higher heat resistance than acrylic to provide thermal stability to the lens. Alternatively, the element L3 may be glass, although the cost of defining an aspheric surface on a glass element may increase the cost of the overall lens.

In Tables Ia-IXa, referred to as the secondary prescriptions, the best fitting spherical surfaces are set forth for each of the aspheric surfaces of primary Tables I-V together with the clear aperture CA of each surface.

The clear aperture CA in each of the secondary prescriptions is the same as the clear aperture in the corresponding primary prescription. The clear aperture is defined as the opening in an optical system component that limits the extent of the bundle of rays incident thereon. The axial distances between surfaces are the same as in the primary tables as are the index of refraction and the Abbe number.

Reference is made to FIGS. 2 and 3 and the prescriptions of Tables VI-VIII. Here the liquid coupler C is so configured and constructed that it forms an element of the third lens unit G3. This construction is disclosed and claimed in co-pending application Ser. No. 820,266 filed on the same date as this application.

Briefly stated, as shown in FIG. 3, a housing defines a peripheral wall which is sealed about CRT screen SC. The housing has a window at the other side which is closed by a meniscus L3 having a strongly concave and aspheric image side S5 surface which provides correction for distortion and field curvature. The element L3 has little optical power per se. The housing is filled with a liquid having an index of refraction close to the index of refraction of element L3 and the CRT screen. Thus, the surface S6 does not have to be highly finished. The material of element L3 may be polycarbonate instead of acrylic to better withstand the heat generated by the CRT and transferred to the coupling liquid. The element L3 and the liquid coupling form lens unit G3.

In another embodiment shown in FIG. 2, an element L4 seals the image side surface of the coupler housing. Element L4 is glass, having a higher resistance to heat than either acrylic or polycarbonate, but does not have an aspheric surface to provide correction for distortion. However, element L4 and the liquid filled housing do provide correction for field curvature. Element L3 is provided in lens unit G3 having an aspheric and strongly concave image side surface for correction of distortion. Here, the elements L3, L4 and the liquid coupling provide the optical power of lens unit G3.

In the following tables the lens elements are identified from the image end to the object end by the reference L followed successively by an arabic numeral. Lens surfaces are identified by the reference S followed by an arabic numeral successively from the image to the object end. The index of refraction of each lens element is given under the heading $N_d$. The dispersion of each lens element as measured by its Abbe number is given by $V_d$. EFL is the equivalent focal length of the lens as scaled for a five inch diagonal measurement CRT. f/No. is the relative aperture of the lens. The aspheric surfaces of the lens elements are in accordance with the coefficients set forth in the foregoing aspheric equation.

In the lenses of Tables I-IV, VI, VII, and IX, the optical power of the cooling medium and CRT screen are not set forth since these powers are on the order of ten to the minus fourteenth power. However, it will be noted that in the lens of Tables V and VIII, the interior surface of the phosphor CRT screen is convex, resulting in the contribution of optical power. Accordingly, in Tables V and VIII, the optical power of the CRT is included in the lens prescription.

TABLE I

| LENS | SURFACE RADII (mm) | AXIAL DISTANCE BETWEEN SURFACES (mm) | $N_d$ | $V_d$ |
|---|---|---|---|---|
| | S1  66.005 | | | |
| L1 | | 8.000 | 1.491 | 57.2 |

TABLE I-continued

| | | | | |
|---|---|---|---|---|
| | S2 | 206.658 | | |
| | | | 29.491 | |
| | S3 | 80.214 | | |
| L2 | | | 22.000 | 1.491 57.2 |
| | S4 | −79.957 | | |
| | | | 38.419 | |
| | S5 | −36.426 | | |
| L3 | | | 2.000 | 1.491 57.2 |
| | S6 | Plano | | | f/No. = 1.0
EFL = 78.64
Semi Field Angle = 35.8°

Aspheric Surfaces S1, S2, S3, S4, S5

| | S1 | S2 | S3 |
|---|---|---|---|
| D | $-0.4255 \times 10^{-6}$ | $0.3151 \times 10^{-6}$ | $0.2250 \times 10^{-6}$ |
| E | $-0.5708 \times 10^{-9}$ | $-0.2865 \times 10^{-9}$ | $-0.3646 \times 10^{-10}$ |
| F | $-0.7857 \times 10^{-13}$ | $0.6562 \times 10^{-13}$ | $0.3798 \times 10^{-12}$ |
| G | $-0.8750 \times 10^{-16}$ | $0.1309 \times 10^{-15}$ | $-0.2195 \times 10^{-16}$ |
| H | $0.7139 \times 10^{-19}$ | $-0.1229 \times 10^{-18}$ | $-0.1481 \times 10^{-18}$ |
| I | $-0.1631 \times 10^{-21}$ | $-0.6775 \times 10^{-22}$ | $0.5067 \times 10^{-22}$ |
| K | | | $-.01$ |

| | S4 | S5 |
|---|---|---|
| D | $-0.1471 \times 10^{-7}$ | $-0.3053 \times 10^{-5}$ |
| E | $0.6774 \times 10^{-10}$ | $0.2619 \times 10^{-8}$ |
| F | $0.2866 \times 10^{-12}$ | $-0.6689 \times 10^{-13}$ |
| G | $-0.5363 \times 10^{-16}$ | $0.2209 \times 10^{-14}$ |
| H | $-0.1782 \times 10^{-18}$ | $-0.5937 \times 10^{-17}$ |
| I | $0.8195 \times 10^{-22}$ | $0.3681 \times 10^{-20}$ |
| K | $-.01$ | $.01$ |

| % CA/2 | $K_y$ |
|---|---|
| 0 | .0051 |
| .267 | .0047 |
| .533 | .0027 |
| .800 | −.0062 |
| 1.0 | −.0219 |

TABLE Ia

| LENS | | SURFACE RADII (mm) | CLEAR APERTURE (mm) |
|---|---|---|---|
| L1 | S1 | 90.9 | 74.40 |
| | S2 | 266.9 | 74.40 |
| L2 | S3 | 76.390 | 73.50 |
| | S4 | −88.380 | 73.50 |
| L3 | S5 | −36.940 | 68.26 |
| | S6 | Plano | 100.00 |

TABLE II

| LENS | | SURFACE RADII (mm) | AXIAL DISTANCE BETWEEN SURFACES (mm) | $N_d$ | $V_d$ |
|---|---|---|---|---|---|
| L1 | S1 | 59.083 | | | |
| | | | 7.000 | 1.491 | 57.2 |
| | S2 | 124.029 | | | |
| | | | 22.605 | | |
| | S3 | 102.219 | | | |
| L2 | | | 27.000 | 1.491 | 57.2 |
| | S4 | −64.593 | | | |
| | | | 42.779 | | |
| | S5 | −38.637 | | | |
| L3 | | | 2.000 | 1.491 | 57.2 |
| | S6 | Plano | | | | f/No. = 1.0
EFL = 78.48
Semi Field Angle = 35.6°

Aspheric Surfaces S1, S2, S3, S4, S5

| | S1 | S2 | S3 |
|---|---|---|---|
| D | $-0.3568 \times 10^{-6}$ | $0.7056 \times 10^{-6}$ | $-0.4168 \times 10^{-6}$ |
| E | $-0.6422 \times 10^{-9}$ | $-0.6771 \times 10^{-10}$ | $0.8955 \times 10^{-10}$ |
| F | $0.2063 \times 10^{-12}$ | $0.1784 \times 10^{-12}$ | $0.5212 \times 10^{-13}$ |
| G | $-0.1799 \times 10^{-16}$ | $0.1469 \times 10^{-15}$ | $0.5070 \times 10^{-17}$ |

TABLE II-continued

| | | | |
|---|---|---|---|
| H | $-0.1073 \times 10^{-18}$ | $-0.1012 \times 10^{-18}$ | $-0.2303 \times 10^{-20}$ |
| I | $-0.5473 \times 10^{-22}$ | $-0.3577 \times 10^{-22}$ | $0.3823 \times 10^{-22}$ |
| K | | | $-.01$ |

| | S4 | S5 |
|---|---|---|
| D | $-0.2980 \times 10^{-6}$ | $-0.2465 \times 10^{-5}$ |
| E | $-0.8180 \times 10^{-10}$ | $0.1867 \times 10^{-8}$ |
| F | $-0.6413 \times 10^{-13}$ | $-0.1066 \times 10^{-11}$ |
| G | $0.1105 \times 10^{-16}$ | $0.2506 \times 10^{-14}$ |
| H | $0.1728 \times 10^{-19}$ | $-0.3208 \times 10^{-17}$ |
| I | $-0.3840 \times 10^{-25}$ | $0.1547 \times 10^{-20}$ |
| K | $-.01$ | $.01$ |

| % CA/2 | $K_y$ |
|---|---|
| 0 | .0044 |
| .160 | .0037 |
| .320 | .0010 |
| .480 | −.0078 |
| .544 | −.0197 |
| .608 | −.0637 |

TABLE IIa

| LENS | | SURFACE RADII (mm) | CLEAR APERTURE (mm) |
|---|---|---|---|
| L1 | S1 | 75.510 | 76.0 |
| | S2 | 99.390 | 76.0 |
| L2 | S3 | 112.800 | 87.0 |
| | S4 | −67.030 | 87.0 |
| L3 | S5 | −39.180 | 71.0 |
| | S6 | Plano | 100.0 |

TABLE III

| LENS | | SURFACE RADII (mm) | AXIAL DISTANCE BETWEEN SURFACES (mm) | $N_d$ | $V_d$ |
|---|---|---|---|---|---|
| L1 | S1 | 66.255 | | | |
| | | | 8.000 | 1.491 | 57.2 |
| | S2 | 191.051 | | | |
| | | | 31.649 | | |
| | S3 | 77.116 | | | |
| L2 | | | 19.000 | 1.491 | 75.2 |
| | S4 | −82.903 | | | |
| | | | 40.248 | | |
| | S5 | −36.972 | | | |
| L3 | | | 2.000 | 1.491 | 57.2 |
| | S6 | Plano | | | | f/No. = 1.0
EFL = 78.70
Semi Field Angle = 36.0°

Aspheric Surfaces S1, S2, S3, S4, S5

| | S1 | S2 | S3 |
|---|---|---|---|
| D | $-0.5104 \times 10^{-6}$ | $0.2855 \times 10^{-6}$ | $0.4013 \times 10^{-6}$ |
| E | $-0.4117 \times 10^{-9}$ | $-0.1463 \times 10^{-10}$ | $-0.8469 \times 10^{-10}$ |
| F | $0.2031 \times 10^{-13}$ | $0.1566 \times 10^{-12}$ | $0.3911 \times 10^{-12}$ |
| G | $0.5341 \times 10^{-16}$ | $0.5370 \times 10^{-16}$ | $-0.2213 \times 10^{-16}$ |
| H | $0.1742 \times 10^{-19}$ | $-0.1997 \times 10^{-18}$ | $-0.1322 \times 10^{-18}$ |
| I | $-0.1700 \times 10^{-21}$ | $-0.5610 \times 10^{-22}$ | $0.5739 \times 10^{-22}$ |
| K | | | $-.01$ |

| | S4 | S5 |
|---|---|---|
| D | $0.3167 \times 10^{-6}$ | $-0.2972 \times 10^{-5}$ |
| E | $-0.2928 \times 10^{-9}$ | $0.2339 \times 10^{-8}$ |
| F | $0.4604 \times 10^{-12}$ | $-0.1192 \times 10^{-11}$ |
| G | $0.1383 \times 10^{-16}$ | $0.2717 \times 10^{-14}$ |
| H | $-0.2322 \times 10^{-18}$ | $-0.4724 \times 10^{-17}$ |
| I | $0.9630 \times 10^{-22}$ | $0.2666 \times 10^{-20}$ |

| % CA/2 | $K_y$ |
|---|---|
| 0 | .0049 |
| .267 | .0044 |
| .533 | .0024 |
| .677 | .0007 |
| .800 | −.0006 |

TABLE III-continued

| | |
|---|---|
| .867 | −.0011 |
| .933 | −.0044 |
| 1.000 | −.0210 |

TABLE IIIa

| LENS | | SURFACE RADII (mm) | CLEAR APERTURE (mm) |
|---|---|---|---|
| L1 | S1 | 88.710 | 74.40 |
| | S2 | 227.400 | 74.40 |
| L2 | S3 | 71.840 | 72.7 |
| | S4 | −95.470 | 72.7 |
| L3 | S5 | −35.840 | 68.48 |
| | S6 | Plano | 100.00 |

TABLE IV

| LENS | | SURFACE RADII (mm) | AXIAL DISTANCE BETWEEN SURFACES (mm) | $N_d$ | $V_d$ |
|---|---|---|---|---|---|
| L1 | S1 | 58.718 | | | |
| | | | 7.000 | 1.491 | 57.2 |
| | S2 | 121.874 | | | |
| | | | 22.889 | | |
| L2 | S3 | 100.773 | | | |
| | | | 27.000 | 1.491 | 57.2 |
| | S4 | −65.053 | | | |
| | | | 42.766 | | |
| L3 | S5 | −38.670 | | | |
| | | | 2.000 | 1.491 | 57.2 |
| | S6 | Plano | | | | f/No. = 1.0
EFL = 78.46
Semi Field Angle = 35.7°

Aspheric Surfaces S1, S2, S3, S4, S5

| | S1 | S2 | S3 |
|---|---|---|---|
| D | −0.3228 × 10⁻⁶ | 0.7572 × 10⁻⁶ | −0.4326 × 10⁻⁶ |
| E | −0.5975 × 10⁻⁹ | −0.7962 × 10⁻¹⁰ | 0.6723 × 10⁻¹⁰ |
| F | 0.1621 × 10⁻¹² | 0.1910 × 10⁻¹² | 0.4057 × 10⁻¹³ |
| G | −0.1125 × 10⁻¹⁶ | 0.1329 × 10⁻¹⁵ | −0.1047 × 10⁻¹⁷ |
| H | −0.9129 × 10⁻¹⁹ | −0.1080 × 10⁻¹⁸ | −0.3139 × 10⁻²⁰ |
| I | −0.6032 × 10⁻²² | −0.2983 × 10⁻²² | 0.4742 × 10⁻²³ |
| K | | | −.01 |

| | S4 | S5 |
|---|---|---|
| D | −0.3014 × 10⁻⁶ | −0.2796 × 10⁻⁵ |
| E | −0.5533 × 10⁻¹⁰ | 0.2300 × 10⁻⁸ |
| F | −0.7621 × 10⁻¹³ | −0.9769 × 10⁻¹² |
| G | 0.7864 × 10⁻¹⁷ | 0.2174 × 10⁻¹⁴ |
| H | 0.1770 × 10⁻¹⁹ | −0.3218 × 10⁻¹⁷ |
| I | 0.7948 × 10⁻²⁶ | 0.1639 × 10⁻²⁰ |
| K | −.01 | .01 |

| % CA/2 | $K_y$ |
|---|---|
| 0 | .0044 |
| .160 | .0037 |
| .320 | .0010 |
| .480 | −.0074 |
| .544 | −.0186 |
| .608 | −.0622 |

TABLE IVa

| LENS | | SURFACE RADII (mm) | CLEAR APERTURE (mm) |
|---|---|---|---|
| L1 | S1 | 75.750 | 77.0 |
| | S2 | 97.420 | 77.0 |
| L2 | S3 | 111.600 | 89.0 |
| | S4 | −67.640 | 89.0 |
| L3 | S5 | −39.240 | 71.0 |
| | S6 | Plano | 100.0 |

TABLE V

| LENS | | SURFACE RADII (mm) | AXIAL DISTANCE BETWEEN SURFACES (mm) | $N_d$ | $V_d$ |
|---|---|---|---|---|---|
| L1 | S1 | 52.647 | | | |
| | | | 9.000 | 1.491 | 57.2 |
| | S2 | 117.896 | | | |
| | | | 17.002 | | |
| L2 | S3 | 96.130 | | | |
| | | | 26.000 | 1.491 | 57.2 |
| | S4 | −61.351 | | | |
| | | | 35.699 | | |
| L3 | S5 | −42.571 | | | |
| | | | 2.000 | 1.491 | 57.2 |
| | S6 | Plano | | | |
| L4 | | | 8.200 | 1.460 | 50.0 |
| | S7 | Plano | | | |
| L5 | | | 15.500 | 1.526 | 60.03 |
| | S8 | −600.001 | | | | f/No. = 1.0
EFL = 73.46
Semi Field Angle = 36.6°

Aspheric Surfaces S1, S2, S3, S4, S5

| | S1 | S2 | S3 |
|---|---|---|---|
| D | −0.5097 × 10⁻⁶ | 0.8316 × 10⁻⁶ | −0.5667 × 10⁻⁶ |
| E | −0.7730 × 10⁻⁹ | 0.1082 × 10⁻⁹ | 0.2059 × 10⁻⁹ |
| F | 0.1995 × 10⁻¹² | 0.2556 × 10⁻¹² | 0.5796 × 10⁻¹³ |
| G | −0.4524 × 10⁻¹⁷ | 0.2097 × 10⁻¹⁵ | −0.1304 × 10⁻¹⁶ |
| H | −0.1880 × 10⁻¹⁸ | −0.1774 × 10⁻¹⁸ | −0.8578 × 10⁻²⁰ |
| I | −0.1193 × 10⁻²¹ | 0.1267 × 10⁻²³ | 0.1444 × 10⁻²² |
| K | | | −.01 |

| | S4 | S5 |
|---|---|---|
| D | −0.4985 × 10⁻⁶ | −0.7325 × 10⁻⁵ |
| E | −0.6420 × 10⁻¹⁰ | 0.7335 × 10⁻⁸ |
| F | −0.1663 × 10⁻¹² | −0.9409 × 10⁻¹¹ |
| G | −0.4377 × 10⁻¹⁷ | 0.4257 × 10⁻¹⁴ |
| H | 0.4216 × 10⁻¹⁹ | −0.1522 × 10⁻¹⁸ |
| I | 0.4502 × 10⁻²³ | −0.3500 × 10⁻²¹ |
| K | −.01 | .01 |

| % CA/2 | $K_y$ |
|---|---|
| 0 | .0052 |
| .280 | .0043 |
| .559 | .0006 |
| .699 | −.0039 |
| .839 | −.0144 |
| .979 | −.0624 |

TABLE Va

| LENS | | SURFACE RADII (mm) | CLEAR APERTURE (mm) |
|---|---|---|---|
| L1 | S1 | 65.480 | 71.50 |
| | S2 | 81.100 | 71.50 |
| L2 | S3 | 100.200 | 82.10 |
| | S4 | −61.460 | 82.10 |
| L3 | S5 | −35.090 | 64.55 |
| | S6 | Plano | 91.37 |
| L4 | S7 | Plano | 101.22 |
| L5 | S8 | −600.001 | 115.69 |

TABLE VI

| SURFACE | AXIAL DISTANCE BETWEEN SURFACES |
|---|---|

TABLE VI-continued

| LENS | | RADII (mm) | (mm) | $N_d$ | $V_d$ |
|---|---|---|---|---|---|
| | S1 | 59.250 | | | |
| L1 | | | 8.000 | 1.491 | 57.2 |
| | S2 | 126.142 | | | |
| | | | 19.841 | | |
| | S3 | 106.127 | | | |
| L2 | | | 29.000 | 1.491 | 57.2 |
| | S4 | −62.052 | | | |
| | | | 40.517 | | |
| | S5 | −38.078 | | | |
| L3 | | | 5.000 | 1.586 | 34.0 |
| | S6 | −46.433 | | | |
| | | | 3.000 | | |
| | S7 | −44.000 | | | |
| L4 | | | 6.000 | 1.526 | 60.0 |
| | S8 | −50.000 | | | |
| L5 | | | 7.000 | 1.460 | 50.0 |
| | S9 | Plano | | | |
| L6 | | | 6.000 | 1.526 | 60.0 |
| | S10 | Plano | | | | f/No. = 1.0
EFL = 78.26
Semi Field Angle = 35.7°

| Aspheric Surfaces S1, S2, S3, S4, S5 | | | |
|---|---|---|---|
| | S1 | S2 | S3 |
| D | $-0.5275 \times 10^{-6}$ | $0.5259 \times 10^{-6}$ | $-0.4787 \times 10^{-6}$ |
| E | $-0.7562 \times 10^{-9}$ | $-0.7944 \times 10^{-10}$ | $0.8750 \times 10^{-10}$ |
| F | $0.3016 \times 10^{-12}$ | $0.2725 \times 10^{-12}$ | $0.6063 \times 10^{-13}$ |
| G | $0.2747 \times 10^{-16}$ | $0.2377 \times 10^{-15}$ | $0.2880 \times 10^{-17}$ |
| H | $-0.9126 \times 10^{-19}$ | $-0.7377 \times 10^{-19}$ | $-0.2519 \times 10^{-20}$ |
| I | $-0.6548 \times 10^{-22}$ | $-0.4335 \times 10^{-22}$ | $0.1101 \times 10^{-23}$ |
| K | | | −1.00 |

| | S4 | S5 |
|---|---|---|
| D | $-0.3346 \times 10^{-6}$ | $0.1236 \times 10^{-5}$ |
| E | $-0.1260 \times 10^{-9}$ | $-0.4714 \times 10^{-9}$ |
| F | $-0.5560 \times 10^{-13}$ | $-0.9912 \times 10^{-12}$ |
| G | $0.9904 \times 10^{-17}$ | $0.3271 \times 10^{-15}$ |
| H | $0.1253 \times 10^{-19}$ | $0.5399 \times 10^{-18}$ |
| I | $-0.1543 \times 10^{-24}$ | $-0.3744 \times 10^{-21}$ |
| K | −1.00 | |

| % CA/2 | $K_y$ |
|---|---|
| 0 | .0044 |
| .133 | .0043 |
| .265 | .0011 |
| .530 | .0008 |
| .663 | −.0072 |
| .795 | −.0102 |
| .928 | −.0311 |
| .994 | −.0637 |

TABLE VIa

| LENS | | SURFACE RADII (mm) | CLEAR APERTURE (mm) |
|---|---|---|---|
| | S1 | 74.480 | 75.2 |
| L1 | | | |
| | S2 | 88.710 | 75.2 |
| | S3 | 117.200 | 89.0 |
| L2 | | | |
| | S4 | −63.870 | 89.0 |
| | S5 | −38.078 | 70.0 |
| L3 | | | |
| | S6 | −44.660 | 77.5 |
| | S7 | −44.000 | 80.0 |
| L4 | | | |
| | S8 | −50.000 | 85.0 |
| L5 | | | |
| | S9 | Plano | 120.0 |
| L6 | | | |
| | S10 | Plano | 125.0 |

TABLE VII

| SURFACE | AXIAL DISTANCE BETWEEN RADII | | | |
|---|---|---|---|---|
| LENS | | RADII (mm) | (mm) | $N_d$ $V_d$ |

| LENS | | RADII (mm) | (mm) | $N_d$ | $V_d$ |
|---|---|---|---|---|---|
| | S1 | 59.859 | | | |
| L1 | | | 8.000 | 1.491 | 57.2 |
| | S2 | 126.597 | | | |
| | | | 20.019 | | |
| | S3 | 104.999 | | | |
| L2 | | | 29.000 | 1.491 | 57.2 |
| | S4 | −62.298 | | | |
| | | | 40.731 | | |
| | S5 | −38.320 | | | |
| L3 | | | 5.000 | 1.586 | 34.0 |
| | S6 | −44.605 | | | |
| | | | 3.000 | | |
| | S7 | −42.000 | | | |
| L4 | | | 6.000 | 1.526 | 60.03 |
| | S8 | −48.000 | | | |
| L5 | | | 7.000 | 1.460 | 50.0 |
| | S9 | Plano | | | | f/No. = 1.0
EFL = 78.27
Semi Field Angle = 35.5°

| Aspheric Surfaces S1, S2, S3, S4, S5 | | | |
|---|---|---|---|
| | S1 | S2 | S3 |
| D | $-0.5394 \times 10^{-6}$ | $0.5062 \times 10^{-6}$ | $-0.4653 \times 10^{-6}$ |
| E | $-0.7509 \times 10^{-9}$ | $-0.1028 \times 10^{-9}$ | $0.7778 \times 10^{-10}$ |
| F | $0.2980 \times 10^{-12}$ | $0.2579 \times 10^{-12}$ | $0.5899 \times 10^{-13}$ |
| G | $0.2197 \times 10^{-16}$ | $0.2388 \times 10^{-15}$ | $0.3768 \times 10^{-17}$ |
| H | $-0.9188 \times 10^{-19}$ | $-0.6914 \times 10^{-19}$ | $-0.2063 \times 10^{-20}$ |
| I | $-0.5645 \times 10^{-22}$ | $-0.4258 \times 10^{-22}$ | $0.1237 \times 10^{-23}$ |
| K | | | −1.0 |

| | S4 | S5 |
|---|---|---|
| D | $-0.3364 \times 10^{-6}$ | $0.1580 \times 10^{-5}$ |
| E | $-0.1158 \times 10^{-9}$ | $-0.1122 \times 10^{-8}$ |
| F | $-0.5415 \times 10^{-13}$ | $-0.8019 \times 10^{-12}$ |
| G | $0.9965 \times 10^{-17}$ | $0.5435 \times 10^{-15}$ |
| H | $0.1264 \times 10^{-19}$ | $0.5326 \times 10^{-18}$ |
| I | $-0.6475 \times 10^{-25}$ | $-0.4744 \times 10^{-21}$ |
| K | −1.0 | |

| % CA/2 | $K_y$ |
|---|---|
| 0 | .0043 |
| .264 | .0037 |
| .530 | .0008 |
| .689 | −.0037 |
| .795 | −.0101 |
| .901 | −.0238 |
| .954 | −.0391 |
| 1.007 | −.0695 |

TABLE VIIa

| LENS | | SURFACE RADII (mm) | CLEAR APERTURE (mm) |
|---|---|---|---|
| | S1 | 76.640 | 76.0 |
| L1 | | | |
| | S2 | 89.920 | 76.0 |
| | S3 | 115.800 | 90.0 |
| L2 | | | |
| | S4 | −64.470 | 90.0 |
| | S5 | −38.320 | 70.5 |
| L3 | | | |
| | S6 | −41.970 | 76.6 |
| | S7 | −42.000 | 76.7 |
| L4 | | | |
| | S8 | −48.00 | 83.8 |
| L5 | | | |
| | S9 | Plano | 120.0 |

TABLE VIII

| LENS | | SURFACE RADII (mm) | AXIAL DISTANCE BETWEEN SURFACES (mm) | $N_d$ | $V_d$ |
|---|---|---|---|---|---|
| | S1 | 52.476 | | | |
| L1 | | | 9.000 | 1.491 | 57.2 |
| | S2 | 117.720 | | | |

TABLE VIII-continued

| | | | | |
|---|---|---|---|---|
| | | 16.640 | | |
| | S3 | 95.471 | | |
| L2 | | | 26.000 | 1.491 57.2 |
| | S4 | −61.646 | | |
| | | | 35.750 | |
| | S5 | −40.480 | | |
| L3 | | | 2.000 | 1.586 34.0 |
| | S6 | −45.194 | | |
| L4 | | | 8.200 | 1.460 50.0 |
| | S7 | Plano | | |
| L5 | | | 15.500 | 1.526 60.03 |
| | S8 | −600.001 | | | f/No. = 1.0
EFL = 73.46
Semi Field Angle = 36.6°

| Aspheric Surfaces S1, S2, S3, S4, S5 | | |
|---|---|---|
| S1 | S2 | S3 |
| D  −0.5367 × 10$^{-6}$ | 0.8323 × 10$^{-6}$ | −0.5358 × 10$^{-6}$ |
| E  −0.7618 × 10$^{-9}$ | 0.1028 × 10$^{-9}$ | 0.2188 × 10$^{-9}$ |
| F  0.1948 × 10$^{-12}$ | 0.2659 × 10$^{-12}$ | 0.6487 × 10$^{-13}$ |
| G  −0.9533 × 10$^{-17}$ | 0.2195 × 10$^{-15}$ | −0.1189 × 10$^{-16}$ |
| H  −0.1828 × 10$^{-18}$ | −0.1797 × 10$^{-18}$ | −0.8486 × 10$^{-20}$ |
| I  −0.1243 × 10$^{-21}$ | −0.7675 × 10$^{-23}$ | 0.1435 × 10$^{-22}$ |
| K | | −1.0 |

| S4 | S5 |
|---|---|
| D  −0.5070 × 10$^{-6}$ | −0.6246 × 10$^{-5}$ |
| E  −0.7779 × 10$^{-10}$ | 0.6940 × 10$^{-8}$ |
| F  −0.1567 × 10$^{-12}$ | −0.9249 × 10$^{-11}$ |
| G  0.4046 × 10$^{-18}$ | 0.4418 × 10$^{-14}$ |
| H  0.4275 × 10$^{-19}$ | −0.1729 × 10$^{-18}$ |
| I  0.4210 × 10$^{-23}$ | −0.4298 × 10$^{-21}$ |
| K  −1.0 | .01 |

| % CA/2 | $K_{1'}$ |
|---|---|
| 0 | .0052 |
| .278 | .0043 |
| .556 | .0005 |
| .694 | −.0055 |
| .833 | −.0149 |
| 1.000 | −.0912 |

TABLE VIIIa

| LENS | | SURFACE RADII (mm) | CLEAR APERTURE (mm) |
|---|---|---|---|
| L1 | S1 | 66.550 | 72.00 |
|  | S2 | 82.220 | 72.00 |
|  | S3 | 96.660 | 83.00 |
| L2 | | | |
|  | S4 | −62.000 | 83.00 |
|  | S5 | −34.860 | 65.00 |
| L3 | | | |
|  | S6 | −45.194 | 71.33 |
| L4 | | | |
|  | S7 | Plano | 101.60 |
| L5 | | | |
|  | S8 | −600.001 | 115.83 |

TABLE IX

| LENS | SURFACE RADII (mm) | AXIAL DISTANCE BETWEEN SURFACES (mm) | $N_d$ | $V_d$ |
|---|---|---|---|---|
| L1 | S1  64.923 | | | |
|  | | 8.000 | 1.491 | 57.2 |
|  | S2  167.500 | | | |
|  | | 31.649 | | |
|  | S3  77.213 | | | |
| L2 | | 19.000 | 1.491 | 57.2 |
|  | S4  −82.190 | | | |
|  | | 41.256 | | |
|  | S5  −37.991 | | | |
| L3 | | 2.000 | 1.491 | 57.2 |
|  | S6  Plano | | | | f/No. = 1.0
EFL = 78.74

TABLE IX-continued

Semi Field Angle = 36.1°

| Aspheric Surfaces S1, S2, S3, S4, S5 | | |
|---|---|---|
| S1 | S2 | S3 |
| D  −0.4147 × 10$^{-6}$ | 0.4570 × 10$^{-6}$ | 0.3570 × 10$^{-6}$ |
| E  −0.3654 × 10$^{-9}$ | −0.6796 × 10$^{-11}$ | −0.7170 × 10$^{-10}$ |
| F  0.3099 × 10$^{-14}$ | 0.1413 × 10$^{-12}$ | 0.3577 × 10$^{-12}$ |
| G  0.3136 × 10$^{-16}$ | 0.2399 × 10$^{-16}$ | −0.3528 × 10$^{-16}$ |
| H  0.3928 × 10$^{-20}$ | −0.2066 × 10$^{-18}$ | −0.1217 × 10$^{-18}$ |
| I  −0.1607 × 10$^{-21}$ | −0.4910 × 10$^{-22}$ | 0.5967 × 10$^{-22}$ |
| K | | −1.00 |

| S4 | S5 |
|---|---|
| D  0.3820 × 10$^{-6}$ | −0.2344 × 10$^{-5}$ |
| E  −0.3734 × 10$^{-9}$ | −0.8612 × 10$^{-9}$ |
| F  0.4649 × 10$^{-12}$ | −0.1620 × 10$^{-11}$ |
| G  0.2219 × 10$^{-16}$ | 0.3729 × 10$^{-14}$ |
| H  −0.2364 × 10$^{-18}$ | −0.3887 × 10$^{-17}$ |
| I  0.1021 × 10$^{-21}$ | 0.1684 × 10$^{-20}$ |
| K  −1.00 | 0.01 |

| % CA/2 | $K_{1'}$ |
|---|---|
| 0 | .00466 |
| 40 | .00338 |
| 60 | .00141 |
| 80 | −.00052 |
| 93.3 | −.00211 |
| 100 | −.01294 |

TABLE IXa

| LENS | | SURFACE RADII (mm) | CLEAR APERTURE (mm) |
|---|---|---|---|
| L1 | S1 | 81.770 | 73.00 |
|  | S2 | 175.200 | 73.00 |
|  | S3 | 72.660 | 73.00 |
| L2 | | | |
|  | S4 | −94.740 | 73.00 |
|  | S5 | −35.800 | 65.00 |
| L3 | | | |
|  | S6 | Plano | 100.0 |

Lens embodying the invention as specified in Tables I–IX have the following parameters:

$0.5 > K_1/K_0 > 0.3$ $1.0 > K_2/K_0 > 0.9$ $1.2 > |K_3/K_0| > 0.7$ where optical powers are calculated from the radii of the lens element of the optical axis A, where $K_1$, $K_2$, and $K_3$ are the optical powers of lens units G1, G2, and G3, respectively, expressed as the reciprocal of the EFL in millimeters, and $K_0$ is the power of the overall lens calculated on the same basis.

Lens embodying the invention where the surfaces of the lens elements are expressed as best fitting spheres as set forth in Tables Ia–IXa have the following parameters:

$0.4 > K_1/K_0 > 0.1$ $1.6 > K_2/K_0 > 1.0$ $1.8 > |K_3/K_0| > 1.0$

From the foregoing parameters, it may be seen that the powers of the lens unit as expressed by calculations based on radii at the optical axis and those based on best fitting spheres for aspheric surfaces differ substantially. This exemplifies the contribution of the aspheric surfaces to provide the necessary off-axis corrections of aberrations.

Table X sets forth the relationship of the power of each lens unit to the power of the overall lens for each of Tables I-IX.

TABLE X

| TABLE | $K_1/K_0$ | $K_2/K_0$ | $K_3/K_0$ | $K_{SC}/K_0$ | $K_C/K_0$ |
|---|---|---|---|---|---|
| I | .408 | .921 | −1.063 | | |
| II | .357 | .929 | −1.008 | | |
| III | .391 | .934 | −1.050 | | |
| IV | .356 | .929 | −1.008 | | |
| V | .332 | .919 | −.852 | .065 | |
| VI | .359 | .931 | −1.041 | | −.747 |
| VII | .353 | .931 | −1.031 | | −.750 |
| VIII | .400 | .919 | −.828 | .065 | −.748 |
| IX | .376 | .938 | −1.023 | | |

In Table X, $K_C$ is the power of the coupler and $K_{SC}$ is the power of the CRT screen where the CRT has a convex object surface.

It will be noted in the lenses of Tables V and VIII, the negative power of the third lens unit G3 is decreased. This is because of the optical power contributed by the CRT screen SC. The correction of field curvature is a direct function of the negative power of the third lens unit, and since the phosphor screen of the CRT is curved towards the lens, smaller correction of the field curvature is required and, therefore, the third lens unit is weaker.

Table XI sets forth the relationship of the power of each lens unit to the power of the overall lens for each of Tables Ia-IXa.

TABLE XI

| TABLE | $K_1/K_0$ | $K_2/K_0$ | $K_3/K_0$ | $K_{SC}/K_0$ | $K_C/K_0$ |
|---|---|---|---|---|---|
| Ia | .350 | 1.108 | −1.286 | | |
| IIa | .219 | 1.418 | −1.600 | | |
| IIIa | .340 | 1.135 | −1.357 | | |
| IVa | .209 | 1.449 | −1.636 | | |
| Va | .215 | 1.532 | −1.757 | .110 | |
| VIa | .174 | 1.561 | −1.762 | | |
| VIIa | .156 | 1.553 | −1.693 | | |
| VIIIa | .207 | 1.5234 | −1.668 | .109 | |
| IXa | .325 | 1.133 | −1.351 | | |

Table XII sets forth the ratio of the absolute value of the first negative power at the limit of the clear aperture $K_{CA}$ of the first element of each of the lenses of Tables I-IX to the optical power at the optical axis. Table XII also sets forth the ratio of the spacing $D_{12}$ between the first and second lens units for each of the lenses of Tables I-IX as a function of the EFL $F_3$ of each third lens unit, and also the spacing $D_{23}$ between the second and third lens units as a function of the EFL $F_0$.

TABLE XII

| TABLE | $|Ky_{CA}/Ky_A|$ | $|D_{12}/F_3|$ | $D_{23}/F_0$ |
|---|---|---|---|
| I | 4.30 | .4 | .490 |
| II | 14.56 | .28 | .545 |
| III | 4.31 | .42 | .571 |
| IV | 14.29 | .292 | .545 |
| V | 12.02 | .197 | .485 |
| VI | 14.42 | .264 | .517 |
| VII | 16.00 | .264 | .520 |
| VIII | 17.50 | .188 | .487 |
| IX | 2.78 | .41 | .523 |

The present invention provides a new and improved lens of the type described which may consist of only three lens units each consisting of only a single element in each lens unit. The lens is of smaller overall length and provides a wider field angle than previous three element projection lenses.

It may thus be seen that the objects of the invention set forth, as well as those made apparent from the foregoing description, are efficiently attained. While preferred embodiments of the invention have been set forth for purposes of disclosure, modifications to the disclosed embodiments of the invention, as well as other embodiments thereof, may occur to those skilled in the art. Accordingly, the appended claims are intended to cover all embodiments of the invention and modifications to the disclosed embodiments which do not depart form the spirit and scope of the invention.

Having thus described the invention, what is claimed is:

1. A projection lens for a cathode ray tube consisting from the image side a first lens unit having two aspheric surfaces, said first lens unit consisting of a single element of generally positive meniscus form and providing correction for aperture dependent aberrations, a second lens unit consisting of a single positive lens element having at least one aspheric surface, said second lens unit providing the majority of the positive power of the overall lens, and a third lens unit having a strongly concave and aspheric image side surface and correcting for field curvature, said first element having an aspheric optical power changing from positive on axis to negative at the edge of the clear aperture of that element, and $$|Ky_{CA}/Ky_A|>2.5,$$

where $Ky_{CA}$ is the aspheric optical power of the lens element of said first lens unit at the maximum clear aperture, and $Ky_A$ is the aspheric optical power of the lens at the optical axis thereof.

2. The lens of claim 1 where said third lens unit comprises a liquid optical coupling between said third lens unit and the cathode ray tube and said liquid coupling provides optical power to the overall lens.

3. The lens of claim 1 where $$0.47>|D_{12}/F_3|>0.16$$

where $D_{12}$ is the axial spacing between said first and second lens units and $F_3$ is the equivalent focal length of the third lens unit.

4. The lens of claim 1 wherein said third lens unit comprises a housing member having a liquid therein in contact with the faceplate of the cathode ray tube and said housing member is closed on the image side by a meniscus element having both surfaces convex to the cathode ray tube.

5. The lens of claim 4 wherein the image side surface of said meniscus element is aspheric to provide correction for distortion.

6. The lens of claim 4 wherein said lens further includes a second meniscus element between said second and third lens units having surfaces convex to the object end and one of the surfaces is aspheric to provide correction for distortion.

7. The lens of claim 1 wherein the image side surface of said first lens element is generally convex to the image side but becomes concave to the image side as the height of the lens from the optical axis approaches the clear aperture of said lens element.

8. The lens of claim 1 where said aspheric surfaces are defined by the equation $$x = \frac{C_r^2}{1 + \sqrt{1 - (1 + K)C^2r^2}} +$$

$$D_r^4 + E_r^6 + F_r^8 + G_r^{10} + H_r^{12} + I_r^{14}$$

where x is the surface sag at a semi-aperture distance y from the axis A of the lens, C is the curvature of a lens surface at the optical axis A equal to the reciprocal of the radius of the optical axis, K is a conic constant.

9. A lens according to claim 8 having a semi-field angle of approximately 35.8° defined substantially as follows:

| LENS | SURFACE RADII (mm) | AXIAL DISTANCE BETWEEN SURFACES (mm) | $N_d$ | $V_d$ |
|---|---|---|---|---|
| | S1 | 66.005 | | |
| L1 | | 8.000 | 1.491 | 57.2 |
| | S2 | 206.658 | | |
| | | 29.491 | | |
| | S3 | 80.214 | | |
| L2 | | 22.000 | 1.491 | 57.2 |
| | S4 | −79.957 | | |
| | | 38.419 | | |
| | S5 | −36.426 | | |
| L3 | | 2.000 | 1.491 | 57.2 |
| | S6 | Plano | | |

Aspheric Surfaces S1, S2, S3, S4, S5

| | S1 | S2 | S3 |
|---|---|---|---|
| D | $-0.4255 \times 10^{-6}$ | $0.3151 \times 10^{-6}$ | $0.2250 \times 10^{-6}$ |
| E | $-0.5708 \times 10^{-9}$ | $-0.2865 \times 10^{-9}$ | $-0.3646 \times 10^{-10}$ |
| F | $-0.7857 \times 10^{-13}$ | $0.6562 \times 10^{-13}$ | $0.3798 \times 10^{-12}$ |
| G | $-0.8750 \times 10^{-16}$ | $0.1309 \times 10^{-15}$ | $-0.2195 \times 10^{-16}$ |
| H | $0.7139 \times 10^{-19}$ | $-0.1229 \times 10^{-18}$ | $-0.1481 \times 10^{-18}$ |
| I | $-0.1631 \times 10^{-21}$ | $-0.6775 \times 10^{-22}$ | $0.5067 \times 10^{-22}$ |
| | | | $-.01$ |

| | S4 | S5 |
|---|---|---|
| D | $-0.1471 \times 10^{-7}$ | $-0.3053 \times 10^{-5}$ |
| E | $0.6774 \times 10^{-10}$ | $0.2619 \times 10^{-8}$ |
| F | $0.2866 \times 10^{-12}$ | $-0.6689 \times 10^{-13}$ |
| G | $-0.5363 \times 10^{-16}$ | $0.2209 \times 10^{-14}$ |
| H | $-0.1782 \times 10^{-18}$ | $-0.5937 \times 10^{-17}$ |
| I | $0.8195 \times 10^{-22}$ | $0.3681 \times 10^{-20}$ |
| | $-.01$ | $.01$ | where L1–L3 are lens elements from the image end, $N_d$ is the index of refraction of the lens elements, $V_d$ is the dispersion of the lens elements measured by their Abbe number, S1–S6 are successive lens surfaces from the image end, the surfaces where positive are on radii struck from the right and where negative are on radii struck from the left, and surfaces S1, S2, S3, S4, and S5 are aspheric as shown.

10. A lens according to claim 8 having a semi-field angle of approximately 35.6° defined substantially as follows:

| LENS | SURFACE RADII (mm) | AXIAL DISTANCE BETWEEN SURFACES (mm) | $N_d$ | $V_d$ |
|---|---|---|---|---|
| | S1 | 59.083 | | |
| L1 | | 7.000 | 1.491 | 57.2 |
| | S2 | 124.029 | | |
| | | 22.605 | | |
| | S3 | 102.219 | | |
| L2 | | 27.000 | 1.491 | 57.2 |
| | S4 | −64.593 | | |
| | | 42.779 | | |
| | S5 | −38.637 | | |
| L3 | | 2.000 | 1.491 | 57.2 |
| | S6 | Plano | | |

Aspheric Surfaces S1, S2, S3, S4, S5

| | S1 | S2 | S3 |
|---|---|---|---|
| D | $-0.3568 \times 10^{-6}$ | $0.7056 \times 10^{-6}$ | $-0.4168 \times 10^{-6}$ |
| E | $-0.6422 \times 10^{-9}$ | $-0.6771 \times 10^{-10}$ | $0.8955 \times 10^{-10}$ |
| F | $0.2063 \times 10^{-12}$ | $0.1784 \times 10^{-12}$ | $0.5212 \times 10^{-13}$ |
| G | $-0.1799 \times 10^{-16}$ | $0.1469 \times 10^{-15}$ | $0.5070 \times 10^{-17}$ |
| H | $-0.1073 \times 10^{-18}$ | $-0.1012 \times 10^{-18}$ | $-0.2303 \times 10^{-20}$ |
| I | $-0.5473 \times 10^{-22}$ | $-0.3577 \times 10^{-22}$ | $0.3823 \times 10^{-22}$ |
| K | | | $-.01$ |

| | S4 | S5 |
|---|---|---|
| D | $-0.2980 \times 10^{-6}$ | $-0.2465 \times 10^{-5}$ |
| E | $-0.8180 \times 10^{-10}$ | $0.1867 \times 10^{-8}$ |
| F | $-0.6413 \times 10^{-13}$ | $-0.1066 \times 10^{-11}$ |
| G | $0.1105 \times 10^{-16}$ | $0.2506 \times 10^{-14}$ |
| H | $0.1728 \times 10^{-19}$ | $-0.3208 \times 10^{-17}$ |
| I | $-0.3840 \times 10^{-25}$ | $0.1547 \times 10^{-20}$ |
| K | $-.01$ | $.01$ | where L1–L3 are lens elements from the image end, $N_d$ is the index of refraction of the lens elements, $V_d$ is the dispersion of the lens elements measured by their Abbe number, S1–S6 are successive lens surfaces from the image end, the surfaces where positive are on radii struck from the right and where negative are on radii struck from the left, and surfaces S1, S2, S3, S4, and S5 are aspheric as shown.

11. A lens according to claim 8 having a semi-field angle of approximately 36.0° defined substantially as follows:

| LENS | SURFACE RADII (mm) | AXIAL DISTANCE BETWEEN SURFACES (mm) | $N_d$ | $V_d$ |
|---|---|---|---|---|
| | S1 | 66.255 | | |
| L1 | | 8.000 | 1.491 | 57.2 |
| | S2 | 191.051 | | |
| | | 31.649 | | |
| | S3 | 77.116 | | |
| L2 | | 19.000 | 1.491 | 75.2 |
| | S4 | −82.903 | | |
| | | 40.248 | | |
| | S5 | −36.972 | | |
| L3 | | 2.000 | 1.491 | 57.2 |
| | S6 | Plano | | |

Aspheric Surfaces S1, S2, S3, S4, S5

| | S1 | S2 | S3 |
|---|---|---|---|
| D | $-0.5104 \times 10^{-6}$ | $0.2855 \times 10^{-6}$ | $0.4013 \times 10^{-6}$ |
| E | $-0.4117 \times 10^{-9}$ | $-0.1463 \times 10^{-10}$ | $-0.8469 \times 10^{-10}$ |
| F | $0.2031 \times 10^{-13}$ | $0.1566 \times 10^{-12}$ | $0.3911 \times 10^{-12}$ |
| G | $0.5341 \times 10^{-16}$ | $0.5370 \times 10^{-16}$ | $-0.2213 \times 10^{-16}$ |
| H | $0.1742 \times 10^{-19}$ | $-0.1997 \times 10^{-18}$ | $-0.1322 \times 10^{-18}$ |
| I | $-0.1700 \times 10^{-21}$ | $-0.5610 \times 10^{-22}$ | $0.5739 \times 10^{-22}$ |
| K | | | $-.01$ |

| | S4 | S5 |
|---|---|---|
| D | $0.3167 \times 10^{-6}$ | $-0.2972 \times 10^{-5}$ |
| E | $-0.2928 \times 10^{-9}$ | $0.2339 \times 10^{-8}$ |
| F | $0.4604 \times 10^{-12}$ | $-0.1192 \times 10^{-11}$ |
| G | $0.1383 \times 10^{-16}$ | $0.2717 \times 10^{-14}$ |
| H | $-0.2322 \times 10^{-18}$ | $-0.4724 \times 10^{-17}$ |
| I | $0.9630 \times 10^{-22}$ | $0.2666 \times 10^{-20}$ | where L1–L3 are lens elements from the image end, $N_d$ is the index of refraction of the lens elements, $V_d$ is the dispersion of the lens elements measured by their Abbe number, S1–S6 are successive lens surfaces from the image end, the surfaces where positive are on radii struck from the right and where negative are on radii struck from the left, and surfaces S1, S2, S3, S4, and S5 are aspheric as shown.

12. A lens according to claim 8 having a semi-field angle of approximately 35.7° defined substantially as follows:

| LENS | SURFACE | SURFACE RADII (mm) | AXIAL DISTANCE BETWEEN SURFACES (mm) | $N_d$ | $V_d$ |
|---|---|---|---|---|---|
| L1 | S1 | 58.718 | | | |
| | | | 7.000 | 1.491 | 57.2 |
| | S2 | 121.874 | | | |
| | | | 22.889 | | |
| L2 | S3 | 100.773 | | | |
| | | | 27.000 | 1.491 | 57.2 |
| | S4 | −65.053 | | | |
| | | | 42.766 | | |
| L3 | S5 | −38.670 | | | |
| | | | 2.000 | 1.491 | 57.2 |
| | S6 | Plano | | | |

| Aspheric Surfaces S1, S2, S3, S4, S5 | | |
|---|---|---|
| S1 | S2 | S3 |
| D −0.3228 × $10^{-6}$ | 0.7572 × $10^{-6}$ | −0.4326 × $10^{-6}$ |
| E −0.5975 × $10^{-9}$ | −0.7962 × $10^{-10}$ | 0.6723 × $10^{-10}$ |
| F 0.1621 × $10^{-12}$ | 0.1910 × $10^{-12}$ | 0.4057 × $10^{-13}$ |
| G −0.1125 × $10^{-16}$ | 0.1329 × $10^{-15}$ | −0.1047 × $10^{-17}$ |
| H −0.9129 × $10^{-19}$ | −0.1080 × $10^{-18}$ | −0.3139 × $10^{-20}$ |
| I −0.6032 × $10^{-22}$ | −0.2983 × $10^{-22}$ | 0.4742 × $10^{-23}$ |
| K | | −.01 |

| S4 | S5 |
|---|---|
| D −0.3014 × $10^{-6}$ | −0.2796 × $10^{-5}$ |
| E −0.5533 × $10^{-10}$ | 0.2300 × $10^{-8}$ |
| F −0.7621 × $10^{-13}$ | −0.9769 × $10^{-12}$ |
| G 0.7864 × $10^{-17}$ | 0.2174 × $10^{-14}$ |
| H 0.1770 × $10^{-19}$ | −0.3218 × $10^{-17}$ |
| I 0.7948 × $10^{-26}$ | 0.1639 × $10^{-20}$ |
| K −.01 | .01 | where L1–L3 are lens elements from the image end, $N_d$ is the index of refraction of the lens elements $V_d$ is the dispersion of the lens elements measured by their Abbe number, S1–S6 are successive lens surfaces from the image end, the surfaces where positive are on radii struck from the right and where negative are on radii struck from the left, and surfaces S1, S2, S3, S4, and S5 are aspheric as shown.

13. A lens according to claim 8 having a semi-field angle of approximately 36.6° defined substantially as follows:

| LENS | SURFACE | SURFACE RADII (mm) | AXIAL DISTANCE BETWEEN SURFACES (mm) | $N_d$ | $V_d$ |
|---|---|---|---|---|---|
| L1 | S1 | 52.647 | | | |
| | | | 9.000 | 1.491 | 57.2 |
| | S2 | 117.896 | | | |
| | | | 17.002 | | |
| L2 | S3 | 96.130 | | | |
| | | | 26.000 | 1.491 | 57.2 |
| | S4 | −61.351 | | | |
| | | | 35.699 | | |
| L3 | S5 | −42.571 | | | |
| | | | 2.000 | 1.491 | 57.2 |
| | S6 | Plano | | | |
| L4 | | | 8.200 | 1.460 | 50.0 |
| | S7 | Plano | | | |
| L5 | | | 15.500 | 1.526 | 60.03 |
| | S8 | −600.001 | | | |

| Aspheric Surfaces S1, S2, S3, S4, S5 | | |
|---|---|---|
| S1 | S2 | S3 |
| D −0.5097 × $10^{-6}$ | 0.8316 × $10^{-6}$ | −0.5667 × $10^{-6}$ |
| E −0.7730 × $10^{-9}$ | 0.1082 × $10^{-9}$ | 0.2059 × $10^{-9}$ |
| F 0.1995 × $10^{-12}$ | 0.2556 × $10^{-12}$ | 0.5796 × $10^{-13}$ |
| G −0.4524 × $10^{-17}$ | 0.2097 × $10^{-15}$ | −0.1304 × $10^{-16}$ |
| H −0.1880 × $10^{-18}$ | −0.1774 × $10^{-18}$ | −0.8578 × $10^{-20}$ |
| I −0.1193 × $10^{-21}$ | 0.1267 × $10^{-23}$ | 0.1444 × $10^{-22}$ |
| K | | −.01 |

| S4 | S5 |
|---|---|
| D −0.4985 × $10^{-6}$ | −0.7325 × $10^{-5}$ |
| E −0.6420 × $10^{-10}$ | 0.7335 × $10^{-8}$ |
| F −0.1663 × $10^{-12}$ | −0.9409 × $10^{-11}$ |
| G −0.4377 × $10^{-17}$ | 0.4257 × $10^{-14}$ |
| H 0.4216 × $10^{-19}$ | −0.1522 × $10^{-18}$ |
| I 0.4502 × $10^{-23}$ | −0.3500 × $10^{-21}$ |
| K −.01 | .01 | where L1–L5 are lens elements from the image end, $N_d$ is the index of refraction of the lens elements, $V_d$ is the dispersion of the lens elements measured by their Abbe number, S1–S8 are successive lens surfaces from the image end, the surfaces where positive are on radii struck from the right and where negative are on radii struck from the left, and surfaces S1, S2, S3, S4, and S5 are aspheric as shown.

14. A lens according to claim 8 having a semi-field angle of approximately 35.7° defined substantially as follows:

| LENS | SURFACE | SURFACE RADII (mm) | AXIAL DISTANCE BETWEEN SURFACES (mm) | $N_d$ | $V_d$ |
|---|---|---|---|---|---|
| L1 | S1 | 59.250 | | | |
| | | | 8.000 | 1.491 | 57.2 |
| | S2 | 126.142 | | | |
| | | | 19.841 | | |
| L2 | S3 | 106.127 | | | |
| | | | 29.000 | 1.491 | 57.2 |
| | S4 | −62.052 | | | |
| | | | 40.517 | | |
| L3 | S5 | −38.078 | | | |
| | | | 5.000 | 1.586 | 34.0 |
| | S6 | −46.433 | | | |
| | | | 3.000 | | |
| L4 | S7 | −44.000 | | | |
| | | | 6.000 | 1.526 | 60.0 |
| | S8 | −50.000 | | | |
| L5 | | | 7.000 | 1.460 | 50.0 |
| | S9 | Plano | | | |
| L6 | | | 6.000 | 1.526 | 60.0 |
| | S10 | Plano | | | |

| Aspheric Surfaces S1, S2, S3, S4, S5 | | |
|---|---|---|
| S1 | S2 | S3 |
| D −0.5275 × $10^{-6}$ | 0.5259 × $10^{-6}$ | −0.4787 × $10^{-6}$ |
| E −0.7562 × $10^{-9}$ | −0.7944 × $10^{-10}$ | 0.8750 × $10^{-10}$ |
| F 0.3016 × $10^{-12}$ | 0.2725 × $10^{-12}$ | 0.6063 × $10^{-13}$ |
| G 0.2747 × $10^{-16}$ | 0.2377 × $10^{-15}$ | 0.2880 × $10^{-17}$ |
| H −0.9126 × $10^{-19}$ | −0.7377 × $10^{-19}$ | −0.2519 × $10^{-20}$ |
| I −0.6548 × $10^{-22}$ | −0.4335 × $10^{-22}$ | 0.1101 × $10^{-23}$ |
| K | | −1.00 |

| S4 | S5 |
|---|---|
| D −0.3346 × $10^{-6}$ | 0.1236 × $10^{-5}$ |
| E −0.1260 × $10^{-9}$ | −0.4714 × $10^{-9}$ |
| F −0.5560 × $10^{-13}$ | −0.9912 × $10^{-12}$ |
| G 0.9904 × $10^{-17}$ | 0.3271 × $10^{-15}$ |
| H 0.1253 × $10^{-19}$ | 0.5399 × $10^{-18}$ |
| I −0.1543 × $10^{-24}$ | −0.3744 × $10^{-21}$ |
| K −1.00 | | where L1–L6 are lens elements from the image end, $N_d$ is the index of refraction of the lens elements, $V_d$ is the dispersion of the lens elements measured by their Abbe number, S1–S10 are successive lens surfaces from the image end, the surfaces where positive are on radii struck from the right and where negative are on radii struck from the left, and surfaces S1, S2, S3, S4, and S5 are aspheric as shown.

15. A lens according to claim 8 having a semi-field angle of approximately 35.5° defined substantially as follows:

| LENS | SURFACE RADII (mm) | AXIAL DISTANCE BETWEEN RADII (mm) | $N_d$ | $V_d$ |
|---|---|---|---|---|
| | S1 | 59.859 | | |
| L1 | | 8.000 | 1.491 | 57.2 |
| | S2 | 126.597 | | |
| | | 20.019 | | |
| | S3 | 104.999 | | |
| L2 | | 29.000 | 1.491 | 57.2 |
| | S4 | −62.298 | | |
| | | 40.731 | | |
| | S5 | −38.320 | | |
| L3 | | 5.000 | 1.586 | 34.0 |
| | S6 | −44.605 | | |
| | | 3.000 | | |
| | S7 | −42.000 | | |
| L4 | | 6.000 | 1.526 | 60.03 |
| | S8 | −48.000 | | |
| L5 | | 7.000 | 1.460 | 50.0 |
| | S9 | Plano | | |

| Aspheric Surfaces S1, S2, S3, S4, S5 | | |
|---|---|---|
| S1 | S2 | S3 |
| D  −0.5394 × 10⁻⁶ | 0.5062 × 10⁻⁶ | −0.4653 × 10⁻⁶ |
| E  −0.7509 × 10⁻⁹ | −0.1028 × 10⁻⁹ | 0.7778 × 10⁻¹⁰ |
| F  0.2980 × 10⁻¹² | 0.2579 × 10⁻¹² | 0.5899 × 10⁻¹³ |
| G  0.2197 × 10⁻¹⁶ | 0.2388 × 10⁻¹⁵ | 0.3768 × 10⁻¹⁷ |
| H  −0.9188 × 10⁻¹⁹ | −0.6914 × 10⁻¹⁹ | −0.2063 × 10⁻²⁰ |
| I  −0.5645 × 10⁻²² | −0.4258 × 10⁻²² | 0.1237 × 10⁻²³ |
| K  | | −1.0 |

| S4 | S5 |
|---|---|
| D  −0.3364 × 10⁻⁶ | 0.1580 × 10⁻⁵ |
| E  −0.1158 × 10⁻⁹ | −0.1122 × 10⁻⁸ |
| F  −0.5415 × 10⁻¹³ | −0.8019 × 10⁻¹² |
| G  0.9965 × 10⁻¹⁷ | 0.5435 × 10⁻¹⁵ |
| H  0.1264 × 10⁻¹⁹ | 0.5326 × 10⁻¹⁸ |
| I  −0.6475 × 10⁻²⁵ | −0.4744 × 10⁻²¹ |
| K  −1.0 | | where L1–L5 are lens elements from the image end, $N_d$ is the index of refraction of the lens elements, $V_d$ is the dispersion of the lens elements measured by their Abbe number, S1–S9 are successive lens surfaces from the image end, the surfaces where positive are on radii struck from the right and where negative are on radii struck from the left, and surfaces S1, S2, S3, S4, and S5 are aspheric as shown.

16. A lens according to claim 8 having a semi-field angle of approximately 36.6° defined substantially as follows:

| LENS | SURFACE RADII (mm) | AXIAL DISTANCE BETWEEN SURFACES (mm) | $N_d$ | $V_d$ |
|---|---|---|---|---|
| | S1 | 52.476 | | |
| L1 | | 9.000 | 1.491 | 57.2 |
| | S2 | 117.720 | | |
| | | 16.640 | | |
| | S3 | 95.471 | | |
| L2 | | 26.000 | 1.491 | 57.2 |
| | S4 | −61.646 | | |
| | | 35.750 | | |
| | S5 | −40.480 | | |
| L3 | | 2.000 | 1.586 | 34.0 |
| | S6 | −45.194 | | |
| L4 | | 8.200 | 1.460 | 50.0 |
| | S7 | Plano | | |
| L5 | | 15.500 | 1.526 | 60.03 |
| | S8 | −600.001 | | |

Aspheric Surfaces S1, S2, S3, S4, S5

| S1 | S2 | S3 |
|---|---|---|
| D  −0.5367 × 10⁻⁶ | 0.8323 × 10⁻⁶ | −0.5358 × 10⁻⁶ |
| E  −0.7618 × 10⁻⁹ | 0.1028 × 10⁻⁹ | 0.2188 × 10⁻⁹ |
| F  0.1948 × 10⁻¹² | 0.2659 × 10⁻¹² | 0.6487 × 10⁻¹³ |
| G  −0.9533 × 10⁻¹⁷ | 0.2195 × 10⁻¹⁵ | −0.1189 × 10⁻¹⁶ |
| H  −0.1828 × 10⁻¹⁸ | −0.1797 × 10⁻¹⁸ | −0.8486 × 10⁻²⁰ |
| I  −0.1243 × 10⁻²¹ | −0.7675 × 10⁻²³ | 0.1435 × 10⁻²² |
| K  | | −1.0 |

| S4 | S5 |
|---|---|
| D  −0.5070 × 10⁻⁶ | −0.6246 × 10⁻⁵ |
| E  −0.7779 × 10⁻¹⁰ | 0.6940 × 10⁻⁸ |
| F  −0.1567 × 10⁻¹² | −0.9249 × 10⁻¹¹ |
| G  0.4046 × 10⁻¹⁸ | 0.4418 × 10⁻¹⁴ |
| H  0.4275 × 10⁻¹⁹ | −0.1729 × 10⁻¹⁸ |
| I  0.4210 × 10⁻²³ | −0.4298 × 10⁻²¹ |
| K  −1.0 | .01 | where L1–L5 are lens elements from the image end, $N_d$ is the index of refraction of the lens elements, $V_d$ is the dispersion of the lens elements measured by their Abbe number, S1–S8 are successive lens surfaces from the image end, the surfaces where positive are on radii struck from the right and where negative are on radii struck from the left, and surfaces S1, S2, S3, S4, and S5 are aspheric as shown.

17. A lens according to claim 8 having a semi-field angle of approximately 36.1° defined substantially as follows:

| LENS | SURFACE RADII (mm) | AXIAL DISTANCE BETWEEN SURFACES (mm) | $N_d$ | $V_d$ |
|---|---|---|---|---|
| | S1 | 64.923 | | |
| L1 | | 8.000 | 1.491 | 57.2 |
| | S2 | 167.500 | | |
| | | 31.649 | | |
| | S3 | 77.213 | | |
| L2 | | 19.000 | 1.491 | 57.2 |
| | S4 | −82.190 | | |
| | | 41.256 | | |
| | S5 | −37.991 | | |
| L3 | | 2.000 | 1.491 | 57.2 |
| | S6 | Plano | | |

Aspheric Surfaces S1, S2, S3, S4, S5

| S1 | S2 | S3 |
|---|---|---|
| D  −0.4147 × 10⁻⁶ | 0.4570 × 10⁻⁶ | 0.3570 × 10⁻⁶ |
| E  −0.3654 × 10⁻⁹ | −0.6796 × 10⁻¹¹ | −0.7170 × 10⁻¹⁰ |
| F  0.3099 × 10⁻¹⁴ | 0.1413 × 10⁻¹² | 0.3577 × 10⁻¹² |
| G  0.3136 × 10⁻¹⁶ | 0.2399 × 10⁻¹⁶ | −0.3528 × 10⁻¹⁶ |
| H  0.3928 × 10⁻²⁰ | −0.2066 × 10⁻¹⁸ | −0.1217 × 10⁻¹⁸ |
| I  −0.1607 × 10⁻²¹ | −0.4910 × 10⁻²² | 0.5967 × 10⁻²² |
| K  | | −1.00 |

| S4 | S5 |
|---|---|
| D  0.3820 × 10⁻⁶ | −0.2344 × 10⁻⁵ |
| E  −0.3734 × 10⁻⁹ | −0.8612 × 10⁻⁹ |
| F  0.4649 × 10⁻¹² | −0.1620 × 10⁻¹¹ |
| G  0.2219 × 10⁻¹⁶ | 0.3729 × 10⁻¹⁴ |
| H  −0.2364 × 10⁻¹⁸ | −0.3887 × 10⁻¹⁷ |
| I  0.1021 × 10⁻²¹ | 0.1684 × 10⁻²⁰ |
| K  −1.00 | 0.01 | where L1–L3 are lens elements from the image end, $N_d$ is the index of refraction of the lens elements, $V_d$ is the dispersion of the lens elements measured by their Abbe number, S1–S6 are successive lens surfaces from the image end, the surfaces where positive are on radii struck from the right and where negative are on radii struck from the left, and surfaces S1, S2, S3, Sr, and S5 are aspheric as shown.

18. A projection lens for a cathode ray tube consisting from the image side a first lens unit having two aspheric surfaces, said first lens unit consisting of a single element of generally positive meniscus form, a second lens unit consisting of a single positive lens element having at least one aspheric surface, said second lens unit providing the majority of the positive power of the overall lens, and a third lens unit having a strongly concave image side surface and correcting for field curvature, and $$0.47 > |D_{12}/F_3| > 0.16$$

where $D_{12}$ is the axial spacing between said first and second lens units and $F_3$ is the equivalent focal length of said third lens unit.

19. The lens of claim 18 where said third lens unit comprises a liquid optical coupling between said third lens unit and the cathode ray tube and said liquid coupling provides optical power to the overall lens.

20. The lens of claim 18 wherein said third lens unit comprises a housing member having a liquid therein in contact with the faceplate of the cathode ray tube and said housing member is closed on the image side by a meniscus element having both surfaces convex to the cathode ray tube.

21. The lens of claim 20 wherein the image side surface of said second meniscus element is aspheric to provide correction for distortion.

22. The lens of claim 20 wherein said lens further includes a second meniscus element between said second and third lens units having surfaces convex to the object end and one of the surfaces is aspheric to provide correction for distortion.

23. The lens of claim 18 wherein the image side surface of said first lens element is generally convex to the image side but becomes concave to the image side as the height of the lens from the optical axis approaches the clear aperture of said lens element.

24. A projection lens for a cathode ray tube consisting from the image side of a first lens unit having at least one aspheric surface and consisting of a single element of generally positive meniscus form convex to the image side, said first lens unit being of relatively weak optical power, a second lens unit consisting of a single positive lens element, said second lens unit providing the majority of the positive power of the overall lens, and a third lens group having a strongly concave image side surface and contributing to correction of field curvature, said element of said first lens unit having an image side aspheric power changing from positive on axis to negative adjacent the edge of the clear aperture, and $$|Ky_{CA}/Ky_A| > 2.5$$

where $Ky_{CA}$ is the aspheric optical power of the lens element of said first lens unit at the maximum clear aperture, and $Ky_A$ is the optical power of the lens at the optical axis thereof, and a corrector lens unit having an aspheric surface positioned between said second and third lens units.

25. The lens of claim 24 where said third lens unit comprises a liquid optical coupling between said third lens unit and the cathode ray tube and said liquid coupling provides optical power to the overall lens.

26. The lens of claim 24 where $$0.47 > |D_{12}/F_3| > 0.16$$

where $D_{12}$ is the axial spacing between said first and second lens units and $F_3$ is the equivalent focal length of the third lens unit.

27. The lens of claim 25 wherein said third lens unit comprises a housing member having a liquid therein in contact with the faceplate of the cathode ray tube and said housing member is closed by a meniscus element having both surfaces convex to the cathode ray tube.

28. The lens of claim 27 wherein the image side surface of said meniscus element is aspheric to provide correction for distortion.

29. The lens of claim 27 wherein said lens further includes a second meniscus element between said second and third lens units and having surfaces convex to the object end and one of the surfaces is aspheric to provide correction for distortion.

30. The lens of claim 24 wherein the image side surface of said first lens element is generally convex to the image side but becomes concave to the image side as the height of the lens from the optical axis approaches the clear aperture of said lens element.

31. A projection lens for a cathode ray tube consisting from the image side of a first lens unit having two aspheric surfaces, said first lens unit consisting of a single element of generally positive meniscus form, a second lens unit consisting of a single positive lens element, said second lens unit providing the majority of the positive power of the overall lens, and a third lens unit having a strongly concave image side surface and providing correction for field curvature, and $$0.47 > |D_{12}/F_3| > 0.16$$

where $D_{12}$ is the axial spacing between said first and second lens units and $F_3$ is the equivalent focal length of the third lens unit, and a corrector lens unit having an aspheric surface positioned between said second and third lens units.

32. The lens of claim 31 where said third lens unit comprises a liquid optical coupling between said third lens unit and the cathode ray tube and said liquid coupling provides optical power to the overall lens.

33. The lens of claim 32 wherein said third lens unit comprises a housing member having a liquid therein adjacent the faceplate of the cathode ray tube and said housing member is closed by a meniscus element having both surfaces convex to the cathode ray tube.

34. The lens of claim 31 wherein the image side surface of said first lens element being generally convex to the image side but becoming concave to the image side as the height of the lens from the optical axis approaches the clear aperture of said lens element.

35. A projection lens for a cathode ray tube consisting from the image side of a first lens unit having two aspheric surfaces, said first lens unit consisting of a single element of generally positive meniscus form, said element having an image side surface which changes from convex at the optical axis to concave as the height of the lens approaches the clear aperture of said lens element, the optical power of said element changing from positive on axis to negative at the edge of the clear aperture of that element, a second lens unit consisting of a single biconvex lens element, said second lens unit providing the majority of the positive power of the overall lens, and a third lens unit having a strongly concave image side surface and contributing to correction of field curvature, and $$0.47 > |D_{12}/F_3| > 0.16$$

where $D_{12}$ is the axial spacing between said first and second lens units and $F_3$ is the equivalent focal length of the third lens unit, and a corrector lens unit having an aspheric surface positioned between said second and third lens units.

36. The lens of claim 35 where said concave surface of said third lens unit is spheric.

37. The lens of claim 35 where said third lens unit comprises a liquid optical coupling between said third lens unit and the cathode ray tube and said liquid coupling provides optical power to the overall lens.

38. The lens of claim 37 wherein said third lens unit comprises a housing member having a liquid therein adjacent the faceplate of the cathode ray tube and said housing member is closed by a meniscus element having both surfaces convex to the cathode ray tube.

39. The lens of claim 35 wherein the image side surface of said first lens element is generally convex but becomes concave to the image side as the height of the lens from the optical axis approaches the clear aperture of said lens element.

40. The lens of claim 39 wherein said third lens unit comprises a housing member having a liquid therein adjacent the faceplate of the cathode ray tube and said housing member is closed by a meniscus element having both surfaces convex to the cathode ray tube.

41. The lens of claim 35 wherein the image side surface of said meniscus element is aspheric to provide correction for distortion.

42. The lens of claim 40 wherein said third lens unit further includes a second meniscus element having surfaces convex to the object end and one of the surfaces is asperhic to provide correction for distortion.

43. A projection lens for a cathode ray tube consisting from the image side of a first lens unit having two aspheric surfaces, said first lens unit consisting of a single element of generally positive meniscus form, a second lens unit consisting of a single positive lens element, said second lens unit providing the majority of the positive power of the overall lens, and a third lens group having a strongly concave image side surface and contributing to correction of field curvature, said element of said first lens unit having an optical power changing from positive on axis to negative at the edge of the clear aperture, and $$|Ky_{CA}/Ky_A| > 2.5$$

where $Ky_{CA}$ is the aspheric optical power of the lens element of said first lens unit at the maximum clear aperture, and $Ky_A$ is the optical power of the lens at the optical axis thereof, and a corrector lens unit having an aspheric surface positioned between said second and third lens units.

44. The lens of claim 43 where said third lens unit comprises a liquid optical coupling between said third lens unit and the cathode ray tube and said liquid coupling provides optical power to the overall lens.

45. The lens of claim 44 where said third lens unit comprises a housing member having a liquid therein adjacent the faceplate of the cathode ray tube and said housing member is closed on the image side by a meniscus element having both surfaces convex to the cathode ray tube.

46. A projection lens consisting from the image end of a first lens unit consisting of a generally meniscus shaped element having an aspheric image side surface which is convex to the image and adjacent the optical axis of the lens but changes to concave to the image adjacent the clear aperture thereof, a second positive lens unit consisting of a single biconvex element providing the majority of the positive power of said projection lens, a third negative lens unit having a concave image side surface and contributing to correction of field curvature, and a corrector lens element of weak optical power having an aspheric surface positioned between said second and third lens units, said element of said first lens unit having positive optical power at the axis thereof and negative optical power adjacent the clear aperture thereof, said concave image side surface of said third lens unit being spherical.

47. The projection lens of claim 46 having a semi-field angle of at least thirty-five degrees.

48. The projection lens of claim 46 where the object side surface of said element of said first lens unit is also aspheric.

49. The lens of claim 46 where $$0.47 > |D_{12}/F_3| > 0.16$$

where $D_{12}$ is the axial spacing between said first and second lens units and $F_3$ is the equivalent focal length of the third lens unit.

50. The lens of claim 46 where said third lens unit comprises a liquid optical coupling between sid third lens unit and the cathode ray tube and said liquid coupling provides optical power to the overall lens.

51. The lens of claim 50 wherein said third lens unit comprises a housing member having a liquid therein in contact with the faceplate of the cathode ray tube and said housing member is closed on the image side by a meniscus element having aboth surfaces convex to the cathode ray tube.

52. The projection lens of claim 46 where $$|Ky_{CA}/Ky_A| > 2.5$$

where $Ky_{CA}$ is the aspherical optical power of the lens element of said first lens unit adjacent the clear aperture thereof, and $Ky_A$ is the optical power of the lens element of said first lens unit at the optical axis thereof.

53. A projection lens for a cathode ray tube consisting from the image side a first lens unit having an aspheric image side surface, said first lens unit consisting of a single element of generally positive meniscus form and providing correction for aperture dependent aberrations, a second lens unit consisting of a single positive biconvex lens element, said second lens unit providing the majority of the positive power of the overall lens, and a third lens unit having a strongly concave image side surface and providing correction for field curvature, said first element having an aspheric optical power changing from positive on axis to negative adjacent the clear aperture thereof, and $$|Ky_{CA}/Ky_A| > 2.5$$

where $Ky_{CA}$ is the optical power of the lens element of said first lens unit adjacent the clear aperture thereof, and $Ky_j$ is the optical power of the lens element at the optical axis thereof.

54. The projection lens of claim 53 having a semi-field angle of at least thirty-five degrees.

55. The projection lens of claim 53 where the object side surface of said element of said first lens unit is also aspheric.

56. The lens of claim 53 where $$0.47 > |D_{12}/F_3| > 0.16$$

where $D_{12}$ is the axial spacing between said first and second lens units and $F_3$ is the equivalent focal length of the third lens unit.

57. The lens of claim 53 where said third lens unit comprises a liquid optical coupling between said third lens unit and the cathode ray tube and said liquid coupling provides optical power to the overall lens.

58. The lens of claim 53 wherein said third lens unit comprises a housing member having a liquid therein in contact with the faceplate of the cathode ray tube and said housing member is closed on the image side by a meniscus element having both surfaces convex to the cathode ray tube.

59. The lens of claim 53 where said concave image side surface of said third lens unit is spherical.

60. The lens of claim 53 further including a corrector lens unit having an aspheric surface positioned between said second and third lens unit.

* * * * *

UNITED STATES PATENT AND TRADEMARK OFFICE
CERTIFICATE OF CORRECTION

PATENT NO. : 4,685,774

DATED : August 11, 1987

INVENTOR(S) : Jacob Moskovich

It is certified that error appears in the above-identified patent and that said Letters Patent is hereby corrected as shown below:

Column 4, Line 15, change "conjunctio" to --conjunction--.

Column 6, Line 20, change "curvatuve" to --curvature--.

Column 16, Line 52, change "millimiters" to --millimeters--.

IN THE CLAIMS

Column 28, Line 34, change "sid" to --said--.

Column 28, Line 41, change "aboth" to -- both --.

Signed and Sealed this

Nineteenth Day of January, 1988

Attest:

DONALD J. QUIGG

Attesting Officer   Commissioner of Patents and Trademarks

(12) EX PARTE REEXAMINATION CERTIFICATE (5210th)
United States Patent
Moskovich

(10) Number: US 4,685,774 C1
(45) Certificate Issued: Oct. 4, 2005

(54) PROJECTION LENS

(75) Inventor: Jacob Moskovich, Cincinnati, OH (US)

(73) Assignee: 3M Innovative Properties Company, St. Paul, MN (US)

Reexamination Request:
No. 90/006,995, Apr. 2, 2004

Reexamination Certificate for:
Patent No.: 4,685,774
Issued: Aug. 11, 1987
Appl. No.: 06/820,553
Filed: Jan. 17, 1986

Certificate of Correction issued Jan. 19, 1988.

(51) Int. Cl.[7] ............................... G02B 3/00; G02B 9/00
(52) U.S. Cl. ........................ 359/650; 359/665; 359/708; 359/772; 359/791

(56) References Cited

U.S. PATENT DOCUMENTS

| 4,469,413 A | 9/1984 | Shirayanagi | 359/718 |
|---|---|---|---|
| 4,620,773 A | 11/1986 | Fukuda | 359/650 |
| 4,682,861 A | 7/1987 | Hosoya | 359/650 |
| 4,699,476 A | 10/1987 | Clarke | 359/650 |
| 4,753,519 A * | 6/1988 | Miyatake | 359/650 |
| 4,810,075 A | 3/1989 | Fukuda | 359/650 |

* cited by examiner

*Primary Examiner*—Jordan Schwartz

(57) ABSTRACT

A compact projection lens for a cathode ray tube having a field angle as great as 73° which may utilize only three lens elements where the first lens element from the image side has two aspheric surfaces in the shape of an overall meniscus which goes from positive optical power at the optical axis to relatively strong negative optical power at the limit of the clear aperture of the lens. The spacing between the first and second lens elements is chosen to aid in contributing to correction of field curvature.

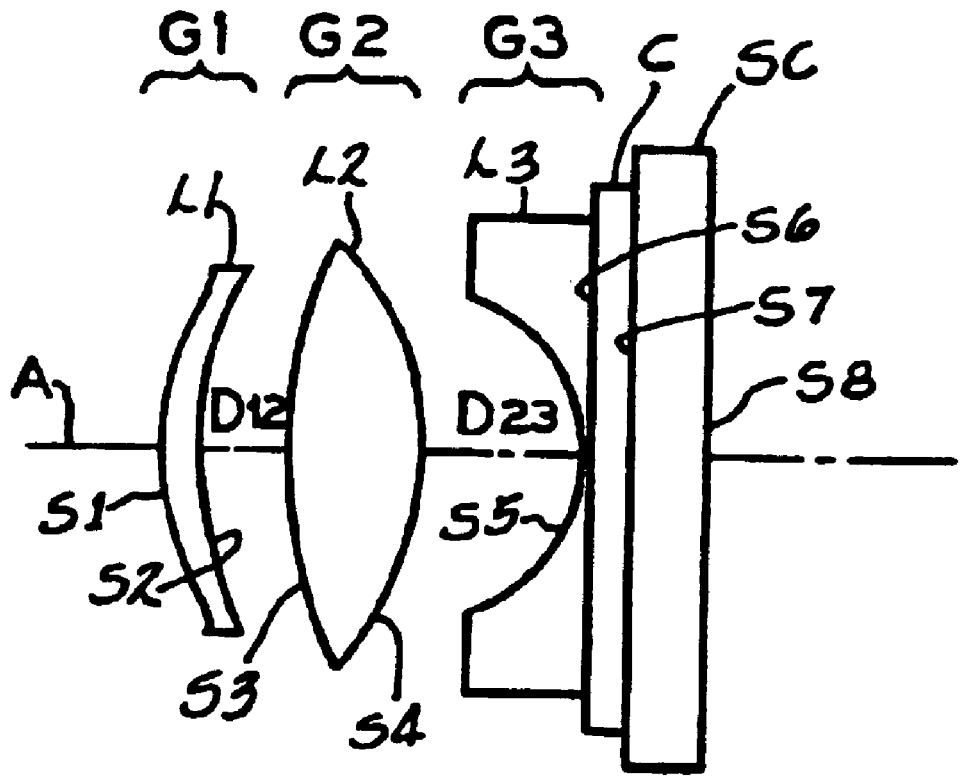

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 9–17, 29 and 42 is confirmed.

Claims 1–8, 18–28, 30, 34–41 and 46–60 are cancelled.

Claims 31 and 43 are determined to be patentable as amended.

Claims 32–33 and 44–45, dependent on an amended claim, are determined to be patentable.

31. A projection lens for a cathode ray tube consisting from the image side of a first lens unit having two aspheric surfaces, said first lens unit consisting of a single element of generally positive meniscus form, a second lens unit consisting of a single positive lens element, said second lens unit providing the majority of the positive power of the overall lens, and a third lens unit having a strongly concave image side surface and providing correction for field curvature, and $$0.47 > |D_{12}/F_3| > 0.16$$

where $D_{12}$ is the axial spacing between said first and second lens units and $F_3$ is the equivalent focal length of the third lens unit, and a corrector lens unit having an aspheric surface positioned between said second and third lens units, *the corrector lens unit being of weak optical power and including a convex object side surface, and the image side surface of said first lens unit being generally convex to the image side but becoming concave to the image side as the height of the lens from the optical axis approaches the clear aperture of said lens element.*

43. A projection lens for a cathode ray tube consisting from the image side of a first lens unit having two aspheric surfaces, said first lens unit consisting of a single element of generally positive meniscus form, a second lens unit consisting of a single positive lens element, said second lens unit providing the majority of the positive power of the overall lens, and a third lens group having a strongly concave image side surface and contributing to correction of field curvature, said element of said first lens unit having an optical power changing from positive on axis to negative at the edge of the clear aperture, and $$|Ky_{CA}/Ky_A| > 2.5$$

where $Ky_{CA}$ is the aspheric optical power of the lens element of said first lens unit at the maximum clear aperture, and $Ky_A$ is the optical power of the lens at the optical axis thereof, and a corrector lens unit having an aspheric surface positioned between said second and third lens units, *said corrector lens unit being of weak optical power and including at least one strongly convex object side, the image side surface of said first lens unit being generally convex to the image side but becoming concave to the image side as the height of the lens from the optical axis approaches the clear aperture of said lens element.*

* * * * *